US012700132B2

(12) United States Patent (10) Patent No.: US 12,700,132 B2
Ogino et al. (45) Date of Patent: Aug. 4, 2026

(54) INFORMATION PROCESSING SYSTEM, INFORMATION PROCESSING APPARATUS, INFORMATION PROCESSING METHOD, AND RECORDING MEDIUM

(71) Applicant: NEC Corporation, Tokyo (JP)

(72) Inventors: Yuka Ogino, Tokyo (JP); Takahiro Toizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1171 days.

(21) Appl. No.: 17/639,955

(22) PCT Filed: Jul. 30, 2021

(86) PCT No.: PCT/JP2021/028434
§ 371 (c)(1),
(2) Date: Feb. 2, 2023

(87) PCT Pub. No.: WO2023/007730
PCT Pub. Date: Feb. 2, 2023

(65) Prior Publication Data
US 2024/0037783 A1 Feb. 1, 2024

(51) Int. Cl.
*G06T 7/73* (2017.01)
*G06V 10/74* (2022.01)
*G06V 40/18* (2022.01)

(52) U.S. Cl.
CPC .............. *G06T 7/74* (2017.01); *G06V 10/761* (2022.01); *G06V 40/193* (2022.01);
(Continued)

(58) Field of Classification Search
CPC .... G06V 10/761; G06V 40/193; G06V 40/18; G06V 40/197; G06T 7/00; G06T 7/74; G06T 2207/20081; G06T 2207/30201
See application file for complete search history.

(56) References Cited

U.S. PATENT DOCUMENTS

2012/0288166 A1* 11/2012 Sun ...................... G06V 40/172
382/218
2019/0043216 A1 2/2019 Yabuuchi et al.
(Continued)

FOREIGN PATENT DOCUMENTS

JP 2017-117119 A 6/2017
JP 2019-028843 A 2/2019
(Continued)

OTHER PUBLICATIONS

Krafka, Kyle, et al. "Eye Tracking for Everyone." 2016 IEEE Conference on Computer Vision and Pattern Recognition (CVPR). IEEE, 2016. (Year: 2016).*
(Continued)

*Primary Examiner* — Tracy Mangialaschi
(74) *Attorney, Agent, or Firm* — Sughrue Mion, PLLC

(57) ABSTRACT

An information processing system includes: an acquisition unit that obtains a both-eye image, which is an image of a face containing both eyes, from a target; and a detection unit that detects an eye position of the target in the both-eye image on the basis of a result of learning that uses a one-eye image containing only one of the eyes and the both-eyes image. According to such an information processing system, the eye position of the target contained in the both-eye image can be detected with high accuracy.

13 Claims, 23 Drawing Sheets

(52) U.S. Cl.
CPC .. *G06V 40/197* (2022.01); *G06T 2207/20081*
(2013.01); *G06T 2207/30201* (2013.01)

(56) References Cited

U.S. PATENT DOCUMENTS

| | | |
|---|---|---|
| 2019/0188470 A1 | 6/2019 | Su et al. |
| 2019/0213310 A1* | 7/2019 | Abe ........................ G06F 21/83 |
| 2021/0350126 A1 | 11/2021 | Shibata et al. |

FOREIGN PATENT DOCUMENTS

| | | | |
|---|---|---|---|
| JP | 2019-124974 A | 7/2019 | |
| JP | 2019-192192 A | 10/2019 | |
| JP | 2020-194599 A | 12/2020 | |
| WO | 2020/079741 A1 | 4/2020 | |

OTHER PUBLICATIONS

Alotaibi, Aziz, and Ausif Mahmmod. "Enhancing OAuth services security by an authentication service with face recognition." 2015 Long Island Systems, Applications and Technology. IEEE, 2015. (Year: 2015).*

Marval-Pérez LR, Ito K, Aoki T. Phase-Based Periocular Recognition with Texture Enhancement. IEICE Transactions on Fundamentals of Electronics, Communications and Computer Sciences. Oct. 1, 2019;102(10):1351-63. (Year: 2019).*

International Search Report for PCT Application No. PCT/JP2021/028434, mailed on Sep. 21, 2021.

\* cited by examiner

S201 OBTAIN ONE-EYE IMAGE AND BOTH-EYE IMAGE

S202 EXTRACT FEATURE FROM IMAGES

S203 GENERATE SIMILARITY MAP

S102 DETECT EYE POSITION

S103 OUTPUT DETECTION RESULT

BOTH-EYE IMAGE

RIGHT-EYE
SIMILARITY MAP

LEFT-EYE
SIMILARITY MAP

ONE-EYE IMAGE

IRIS SIZE IS MATCHED

BOTH-EYE IMAGE

RIGHT-EYE
SIMILARITY MAP

LEFT-EYE
SIMILARITY MAP

INFORMATION PROCESSING SYSTEM, INFORMATION PROCESSING APPARATUS, INFORMATION PROCESSING METHOD, AND RECORDING MEDIUM

This application is a National Stage Entry of PCT/JP2021/028434 filed on Jul. 30, 2021, the contents of all of which are incorporated herein by reference, in their entirety.

TECHNICAL FIELD

The disclosure relates to an information processing system, an information processing apparatus, an information processing method, and a recording medium.

BACKGROUND ART

A known system of this type obtains information about eyes from an image of a target. For example, Patent Literature 1 discloses a technique/technology in which whether an eye in a second image obtained by capturing eyes of a user is a left eye or a right eye is determined on the basis of a first image containing a whole body of the user. Patent Literature 2 discloses a technique/technology in which a feature of an image is calculated in each predetermined range, and a point at which a degree of similarity with a feature of an iris recorded in advance is greater than or equal to a predetermined threshold is detected as a position of an iris.

As another related technique/technology, Patent Literature 3 discloses a similarity map illustrating a relation among feature quantities extracted from a biometric information. Patent Literature 4 discloses that a cosine similarity of a feature of a living body is calculated to perform authentication.

CITATION LIST

Patent Literature

Patent Literature 1: International Publication No. WO2020/079741
Patent Literature 2: JP2020-194599A
Patent Literature 3: JP2019-124974A
Patent Literature 4: JP2017-117119A

SUMMARY

Technical Problem

This disclosure aims to improve the techniques/technologies disclosed in the Patent Literatures.

Solution to Problem

An information processing system according to an example aspect of this disclosure includes: an acquisition unit that obtains a both-eye image, which is an image of a face containing both eyes, from a target; and a detection unit that detects an eye position of the target in the both-eye image on the basis of a result of learning that uses a one-eye image containing only one of the eyes and the both-eyes image.

An information processing apparatus according to an example aspect of this disclosure includes: an acquisition unit that obtains a both-eye image, which is an image of a face containing both eyes, from a target; and a detection unit that detects an eye position of the target in the both-eye image on the basis of a result of learning that uses a one-eye image containing only one of the eyes and the both-eyes image.

An information processing method according to an example aspect of this disclosure is an information processing apparatus including: an acquisition unit that obtains a both-eye image, which is an image of a face containing both eyes, from a target; and a detection unit that detects an eye position of the target in the both-eye image on the basis of a result of learning that uses a one-eye image containing only one of the eyes and the both-eyes image.

On a recording medium according to an example aspect of this disclosure, a computer program that allows at least one computer to execute an information processing method is recorded, the information processing method including: obtaining a both-eye image, which is an image of a face containing both eyes, from a target; and detecting an eye position of the target in the both-eye image on the basis of a result of learning that uses a one-eye image containing only one of the eyes and the both-eyes image.

DESCRIPTION OF EXAMPLE EMBODIMENTS

Hereinafter, an information processing system, an information processing apparatus, an information processing method, and a recording medium according to example embodiments will be described with reference to the drawings.

First Example Embodiment

An information processing system according to a first example embodiment will be described with reference to FIG. 1 to FIG. 4.
(Hardware Configuration)

Figure 1:
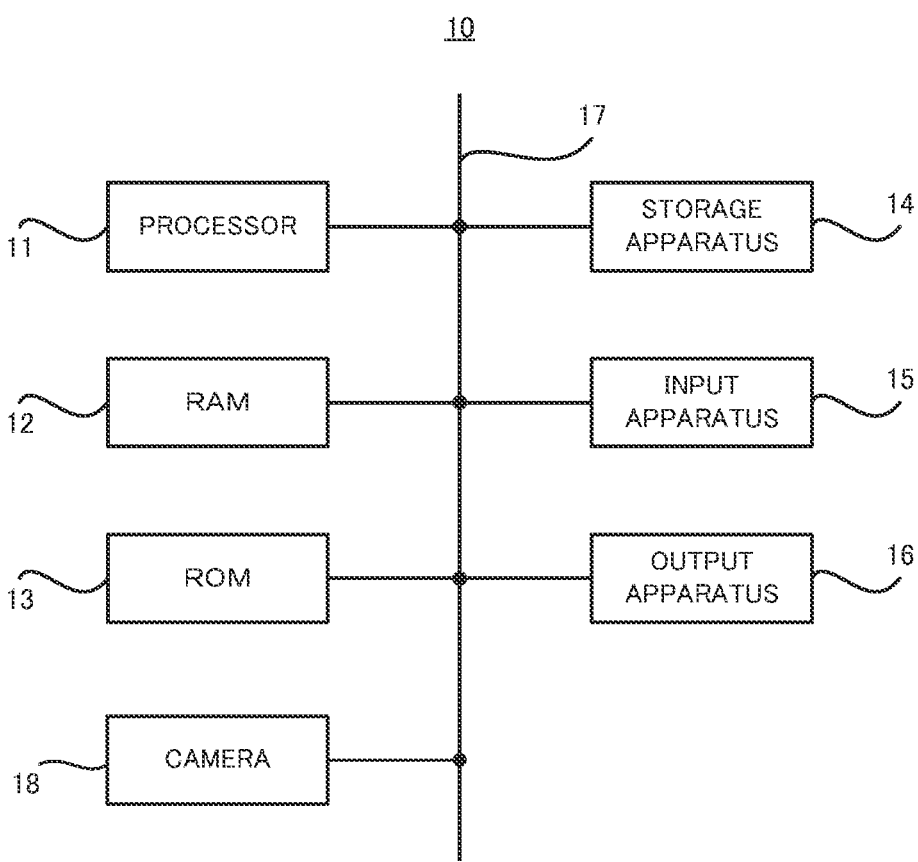
FIG. 1 is a block diagram illustrating a hardware configuration of an information processing system according to a first example embodiment.

Firstly, a hardware configuration of the information processing system according to the first example embodiment will be described with reference to FIG. 1. FIG. 1 is a block diagram illustrating the hardware configuration of the information processing system according to the first example embodiment.

As illustrated in FIG. 1, an information processing system 10 according to the first example embodiment includes a processor 11, a RAM (Random Access Memory) 12, a ROM (Read Only Memory) 13, and a storage apparatus 14. The information processing system 10 may further include an input apparatus 15 and an output apparatus 16. The informational method processing system 10 may also include a camera 18. The processor 11, the RAM 12, the ROM 13, the storage apparatus 14, the input apparatus 15, the output apparatus 16, and the camera 18 described above are connected through a data bus 17.

The processor 11 reads a computer program. For example, the processor 11 is configured to read a computer program stored in at least one of the RAM 12, the ROM 13 and the storage apparatus 14. Alternatively, the processor 11 may read a computer program stored in a computer readable recording medium, by using a not-illustrated recording medium reading apparatus. The processor 11 may obtain (i.e., read) a computer program from a not-illustrated apparatus located outside the information processing system 10, through a network interface. The processor 11 controls the RAM 12, the storage apparatus 14, the input apparatus 15, and the output apparatus 16 by executing the read computer program. Especially in this example embodiment, when the processor 11 executes the read computer program, a functional block for detecting the position of an eye of a target in a both-eye image is implemented in the processor 11.

The processor 11 may be configured, for example, as a CPU (Central Processing Unit), a GPU (Graphics Processing Unit), a FPGA (field-programmable gate array), a DSP (Demand-Side Platform), and an ASIC (Application Specific Integrated Circuit). The processor 11 may be configured in one of these, or may be configured to use a plurality of them in parallel.

The RAM 12 temporarily stores the computer program to be executed by the processor 11. The RAM 12 temporarily stores the data that is temporarily used by the processor 11 when the processor 11 executes the computer program. The RAM 12 may be, for example, a D-RAM(Dynamic RAM).

The ROM 13 stores the computer program to be executed by the processor 11. The ROM 13 may otherwise store fixed data. The ROM 13 may be, for example, a P-ROM (Programmable ROM).

The storage apparatus 14 stores the data that is stored for a long term by the information processing system 10. The storage apparatus 14 may operate as a temporary storage apparatus of the processor 11. The storage apparatus 14 may include, for example, at least one of a hard disk apparatus, a magneto-optical disk apparatus, an SSD (Solid State Drive), and a disk array apparatus.

The input apparatus 15 is an apparatus that receives an input instruction from a user of the information processing system 10. The incoming apparatus 15 may include, for example, at least one of a keyboard, a mouse, and a touch panel. The input apparatus 15 may be configured as a portable terminal, such as a smartphone or tablet.

The output apparatus 16 is an apparatus that outputs information about the information processing system 10 to the outside. For example, the output apparatus 16 may be a display apparatus (e.g., a display) that is configured to display the information about the information processing system 10. The output apparatus 16 may be a speaker or the like that is configured to output an audio information about the information processing system 10. The output apparatus 16 may be configured as a portable terminal, such as a smartphone or tablet.

The camera 18 is a camera installed in a position at which an image of the target (specifically, an image containing a face of the target) can be captured. The camera 18 may be a camera mounted on a terminal (e.g., a smartphone) of the target. Incidentally, the target here is not limited to a human, but also may include an animal, such as a dog and a snake, and a robot or the like. The camera 18 may be a camera for capturing a still image or a camera for recording a video. The camera 18 may be configured as a visible light camera or as a near infrared camera. A plurality of cameras 18 may be provided. In this case, the cameras 18 may be different types of cameras. For example, a visible light camera and a near infrared camera may be provided separately.

FIG. 1 exemplifies the information processing system 10 that includes a plurality of apparatus, but the functions of all or a part of these may be realized by one apparatus (information processing apparatus). The information processing apparatus may include, for example, only with the processor 11, the RAM 12, and the ROM 13 described above, and, for example, an external apparatus connected to the information processing apparatus may include the other components (i.e., the storage apparatus 14, the input apparatus 15, the output apparatus 16, the camera 18). In addition, the information processing apparatus may realize a partial arithmetic function by an external apparatus (e.g., external servers, clouds, etc.).

(Functional Configuration)

Figure 2:
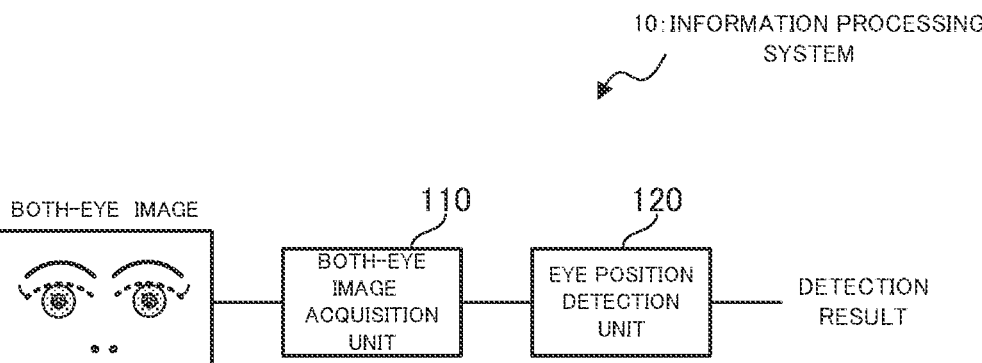
FIG. 2 is a block diagram illustrating a functional configuration of the information processing system according to the first example embodiment.

Next, a functional configuration of the information processing system 10 according to the first example embodiment will be described with reference to FIG. 2. FIG. 2 is a block diagram illustrating the functional configuration of the information processing system according to the first example embodiment.

As illustrated in FIG. 2, the information processing system 10 according to the first example embodiment includes a both-eye image acquisition unit 110 and an eye position detection unit 120, as components for realizing its function. Each of the both-eye image acquisition unit 110 and the eye position detection unit 120 may be a processing block implemented, for example, by the processor 11 described above (see FIG. 1). The both-eye image acquisition unit 110 may also obtain an image by using the camera18 described above.

The both-eye image acquisition unit 110 is configured to obtain a both-eye image containing both eyes, from the target. The both-eye image may be an image containing an entire face, or may be an image containing a part of the face. When the both-eye image is an image containing a part of the face, the both-eye image acquisition unit 110 may obtain the both-eye image by cutting out a part of the image containing an entire face. The both-eye image acquisition unit 110 may have a function of changing a size in the obtained both-eye image. For example, the both-eye image acquisition unit 110 may be configured to scale (enlarge or reduce) the both-eye image. The both-eye image obtained by the both-eye image acquisition unit 110 is outputted to the eye position detection unit 120.

The eye position detection unit 120 is configured to detect the position of an eye of the target in the both-eye image obtained by the both-eye image acquisition unit 110. The eye position detection unit 120 may detect, for example, the position of each of both eyes (i.e., a right eye and a left eye), or may detect only the position of one of the eyes. The eye position detection unit 120 may have a function of outputting information about the detected eye position.

Figure 3:
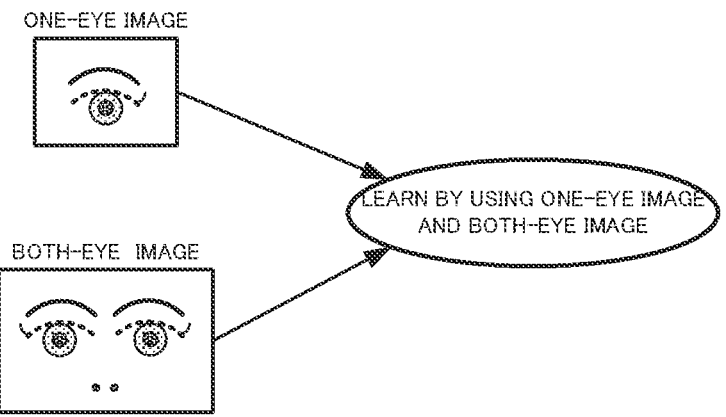
FIG. 3 is a conceptual diagram illustrating a learning method of the information processing system according to the first example embodiment.

In particular, the eye position detection unit 120 is configured to detect the eye position on the basis of a result of learning that is performed in advance. In the following, with reference to FIG. 3, a learning method of the eye position detection unit 120 will be described. FIG. 3 is a conceptual diagram illustrating the learning method of the information processing system according to the first example embodiment.

As illustrated in FIG. 3, the eye position detection unit 120 is allowed to learn by using a one-eye image (i.e., an image containing only one of the eyes) and a both-eye image (i.e., an image containing both eyes). The eye position detection unit 120 may be allowed to learn by using a plurality of one-eye images and both-eye images. The eye position detection unit 120 may be configured to detect the position of an eye by using a model (i.e., a detecting model for detecting the position of an eye) generated by machine learning that uses the one-eye image and the both-eye image.

A more specific learning method of the eye position detection unit 120 will be described in detail in another example embodiment described later.

(Flow of Operation)

Figure 4:
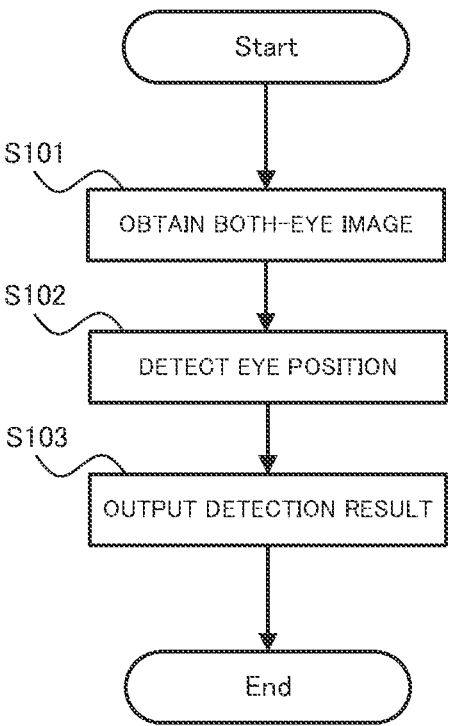
FIG. 4 is a flowchart illustrating a flow of operation by the information processing system according to the first example embodiment.

Next, with reference to FIG. 4, a flow of operation by the information processing system 10 according to the first example embodiment will be described. FIG. 4 is a flowchart illustrating the flow of operation by the information processing system according to the first example embodiment.

As illustrated in FIG. 4, in operation of the information processing system 10 according to the first example embodiment, firstly, the both-eye image acquisition unit 110 obtains a both-eye image from a target (step S101). The both-eye image may be obtained, for example, with the target standing still in front of the camera 18, or may be obtained at a timing when the walking target arrives at a focal position of the camera 18. The both-eye image acquisition unit 110 may obtain a plurality of both-eye images from the same target.

Then, the eye position detection unit 120 detects an eye position of the target in the both-eye image obtained by the both-eye image acquisition unit 110 (step S102). As described above, the eye position detection unit 120 detects the eye position of the target on the basis of a result of the learning that uses the one-eye image and the both-eye image.

Then, the eye position detection unit 120 outputs a detection result (i.e., information about the detected eye position) (step S103). There is no particular limitation on how to use the detection result, but it may be utilized, for example, in an iris authentication. Specifically, for example, an eye area may be cut out by using the information about the eye position, iris coordinates may be detected with high accuracy from the cut-out eye area, and authentication may be performed by using an iris of the detected coordinates.

Technical Effect

Next, a technical effect obtained by the information processing system 10 according to the first example embodiment will be described.

As described in FIG. 1 to FIG. 4, in the information processing system 10 according to the first example embodiment, the position of an eye of the target in the both-eye image is detected on the basis of the result of the learning that uses the one-eye image and the both-eye image. In this way, the position of an eye of the target contained in the both-eye image can be detected with high accuracy. Especially in this example embodiment, an image containing both eyes is a target, and thus, it is hardly possible to apply a technique/technology of detecting the position of an eye from an image that originally contains only one eye. In this example embodiment, however, since the result of the learning that uses both the one-eye image and the both-eye image is used, the position of an eye can be appropriately detected from the both-eye image. When the both-eye image is an image containing a part of the face, for example, a technique/technology of detecting an eye from an image of the entire face (e.g., a keypoint detection using parts of the face) cannot be applied as it is. Even in such cases, in this example embodiment, the position of an eye can be appropriately detected on the basis of the result of the learning that uses both the one-eye image and the both-eye image.

When the detection result of the information processing system 10 according to the first example embodiment is used for the iris authentication, if the accuracy of detecting the position of an eye is improved, the throughput of authentication can be improved and a success rate of the authentication can be improved.

Second Example Embodiment

The information processing system 10 according to a second example embodiment will be described with reference to FIG. 5 and FIG. 6. Incidentally, the second example embodiment partially differs from the first example embodiment described above only in the configuration and the operation, and may be the same as the first example embodiment in the other parts. Therefore, the parts that differ from the first example embodiment described above will be described in detail below, and the other overlapping parts will not be described.

(Functional Configuration)

Firstly, with reference to FIG. 5, a functional configuration of the information processing system 10 according to the second example embodiment will be described. FIG. 5 is a block diagram illustrating the functional configuration of the information processing system according to the second example embodiment. Incidentally, in FIG. 5, the same components as those illustrated in FIG. 2 carry the same reference numerals.

Figure 5:
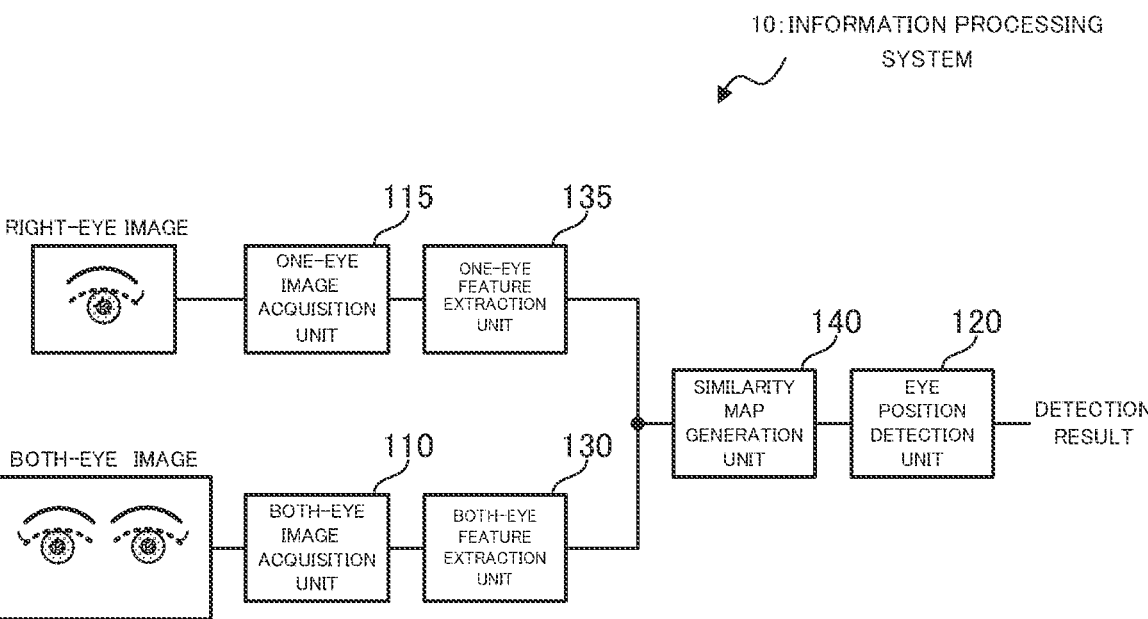
FIG. 5 is a block diagram illustrating a functional configuration of an information processing system according to a second example embodiment.

As illustrated in FIG. 5, the information processing system 10 according to the second example embodiment includes a both-eye image acquisition unit 110, a one-eye acquisition unit 115, a both-eye feature extraction unit 130, a one-eye feature extraction unit 135, a similarity map generation unit 140, and an eye position detection unit 120, as components for realizing its functions. That is, the information processing system according to the second example embodiment further includes the both-eye feature extraction unit 130, the one-eye image acquisition unit 115, the one-eye feature extraction unit 135, and the similarity map generation unit 140 in addition to the configuration in the first example embodiment (see FIG. 2). Each of the both-eye feature extraction unit 130, the both-eye image acquisition unit 115, the one-eye feature extraction unit 135, and the similarity map generation unit 140 may be a processing block implemented, for example, by the processor 11 described above (see FIG. 1).

The both-eye feature extraction unit 130 is configured to extract a feature (hereinafter referred to as a "both-eye feature" as appropriate) from the both-eye image obtained by the both-eye image acquisition unit 110. A detailed description of a method of extracting the both-eye feature will be omitted here because the existing technique/technology can be appropriately adopted to the method. The both-eye feature may be extracted to maintain a size ratio of the both-eye image. For example, from a 96×256 size image, an 8×32×128 size feature including a dimension of the number of channels may be extracted. The both-eye feature extraction unit 130 may extract the feature on the basis of the result of the learning that uses the one-eye image and the both-eye image. That is, in the second example embodiment, the both-eye feature extraction unit 130 may be allowed to learn in place of the eye position detection unit 120. In this case, the both-eye feature extraction unit 130 may be a feature extractor including CNN (Convolutional Neural Network) or the like, which is represented, for example, by ResNet, VGGNet, GoogleNet, ResNext, SENet, and EfficientNet. The both-eye feature extracted by the both-eye feature extraction unit 130 is configured to be outputted to the similarity map generation unit 140.

The one-eye image acquisition unit 115 is configured to obtain a one-eye image containing only one of the eyes. Incidentally, the one-eye image here is a one-eye image prepared in advance as a reference when generating a similarity map described later (hereinafter referred to as a "reference one-eye image" as appropriate). For this reason, the one-eye image may not be an image containing an eye of the same target as that of the both-eye image. The reference one-eye image may be an image obtained by imaging the user. The reference one-eye image may also be an image generated by image processing or the like. For example, the reference one-eye image may be a mean image obtained by averaging the one-eye images of a plurality of users. The reference one-eye image obtained by the one-eye image acquisition unit 115 is configured to be outputted to the one-eye feature extraction unit 135.

The one-eye feature extraction unit 135 is configured to extract a feature (hereinafter referred to as a "one-eye feature" as appropriate) from the reference one-eye image obtained by the one-eye image acquisition unit 115. The one-eye feature may be extracted to maintain a size ratio of the reference one-eye image. The one-eye feature extraction unit 135 may extract the feature on the basis of the result of the learning that uses the one-eye image and the both-eye image. That is, the one-eye feature extraction unit 135 may be allowed to learn as in the both-eye feature extraction unit 130 described above. In this case, the one-eye feature extraction unit 135 may be a feature extractor including CNN (Convolutional Neural Network) or the like, which is represented, for example, by ResNet, VGGNet, GoogleNet, ResNext, SENet, and EfficientNet. Incidentally, the one-eye feature extraction unit 135 may use the same unit as the both-eye feature extraction unit 130 described above. That is, it may be configured as one feature extraction unit that extracts the both-eye feature from the both-eye image and that extracts the one-eye feature from the reference one-eye image. The one-eye feature extracted by the one-eye feature extraction unit 135 is configured to be outputted to the similarity map generation unit 140.

The similarity map generation unit 140 is configured to generate a similarity map indicating a similarity between the both-eye feature extracted by the both-eye feature extraction unit 130 and the one-eye feature extracted by the uniocular feature extraction unit 135. The similarity map is information indicating a positional relationship with respect to the similarity. The similarity map is generated, for example, as a map in which a part that corresponds to the position of an eye has a high value and a part that is not the position of an eye has a low value. A specific example of the similarity map will be described in another example embodiment described later. The similarity map generated by the similarity map generation unit 140 is configured to be outputted to the eye position detection unit 120. In particular, the eye position detection unit 120 according to the second example embodiment is configured to detect the eye position of the target on the basis of the similarity map generated by the similarity map generation unit 140.

(Flow of Operation)

Next, with reference to FIG. 6, a flow of operation by the information processing system 10 according to the second example embodiment will be described. FIG. 6 is a flowchart illustrating the flow of operation by the information processing system according to the second example embodiment. Incidentally, in FIG. 6, the same steps as those described in FIG. 4 carry the same reference numerals.

Figure 6:
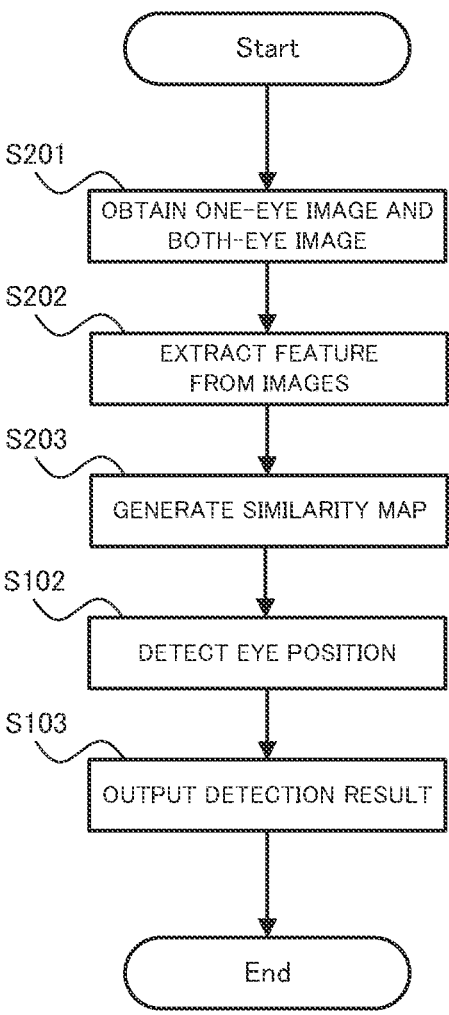
FIG. 6 is a flowchart illustrating a flow of operation by the information processing system according to the second example embodiment.

As illustrated in FIG. 6, in operation of the information processing system 10 according to the second example embodiment, firstly, the one-eye image acquisition unit 115 obtains the reference one-eye image, and the both-eye image acquisition unit 110 obtains the both-eye image (step S201). Then, the one-eye feature extraction unit 135 extracts the one-eye feature from the reference one-eye image, and the both-eye feature extraction unit 130 extracts the both-eye feature from the both-eye image (step S202). In this example, a process for the reference one-eye image and a process for the both-eye image are performed in parallel; however, the process for the reference one-eye image and the process for the both-eye image may be performed, sequentially and separately.

Subsequently, the similarity map generation unit 140 generates the similarity map on the basis of the one-eye feature extracted by the one-eye feature extraction unit 135 and the both-eye feature extracted by the both-eye feature extraction unit 130 (step S203). Then, the eye position detection unit 120 detects the eye position of the target on the basis of the similarity map generated by the similarity map generation unit 140 (step S102). When the size of the similarity map differs from the size of the both-eye image (e.g., when the size is reduced during the process of generating the similar map), a process of changing the size of the similarity map may be performed. Then, the eye position detection unit 120 outputs a detection result (i.e., information about the detected eye position) (step S103).

Technical Effect

Next, a technical effect obtained by the information processing system 10 according to the second example embodiment will be described.

As described in FIG. 5 and FIG. 6, in the information processing system 10 according to the second example embodiment, the eye position of the target in the both-eye image is detected on the basis of the similarity map generated from the one-eye feature and the both-eye feature. In this way, the eye position can be detected at a higher speed and with higher accuracy than those when the similarity map is not used.

Third Example Embodiment

The information processing system 10 according to a third example embodiment will be described with reference to FIG. 7 to FIG. 9. Incidentally, the third example embodiment partially differs from the first and second example embodiments described above in configuration and operation, and may be the same as the first and second example embodiments in the other parts. Therefore, the parts that differ from the example embodiments described above will be described in detail below, and the other overlapping parts will not be described.
(Functional Configuration)

Firstly, with reference to FIG. 7, a functional configuration of the information processing system 10 according to the third example embodiment will be described. FIG. 7 is a block diagram illustrating the functional configuration of the information processing system according to a third example embodiment. In FIG. 7, the same components as those illustrated in FIG. 2 and FIG. 5 carry the same reference numerals.

Figure 7:
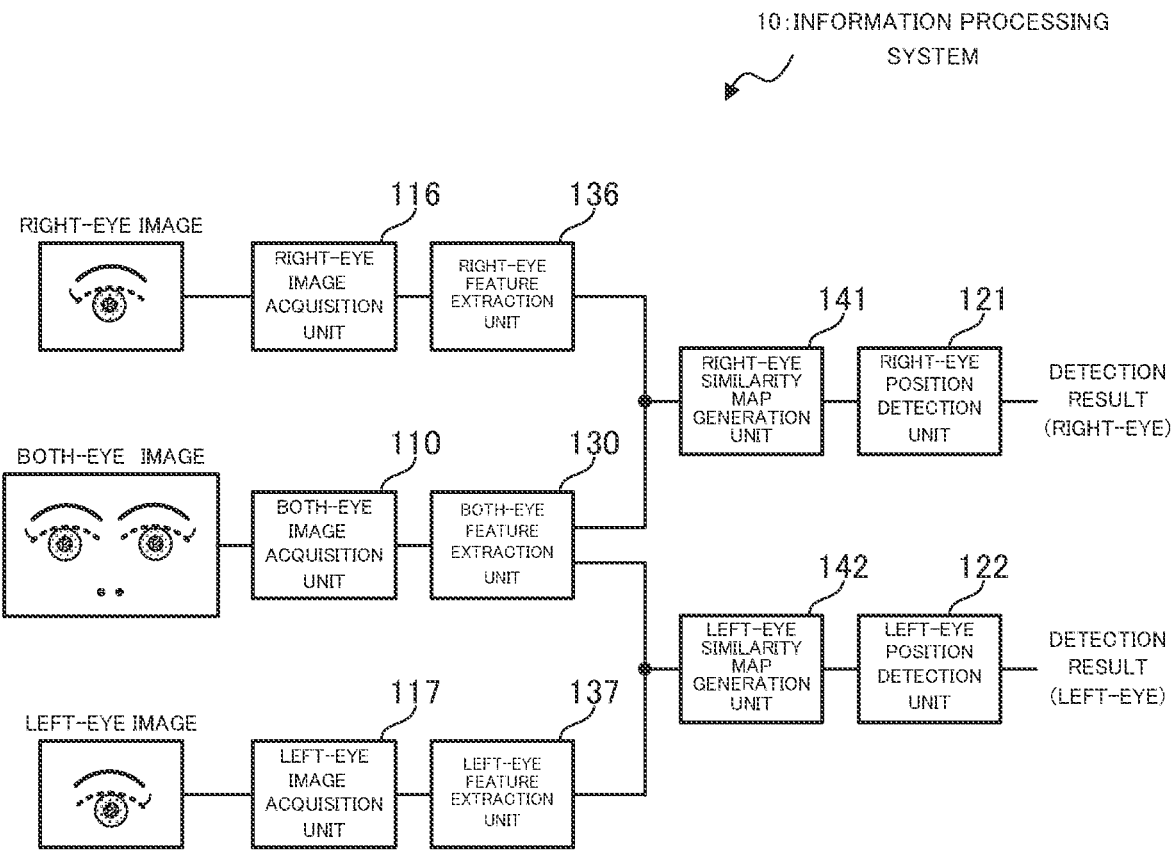
FIG. 7 is a block diagram illustrating a functional configuration of an information processing system according to a third example embodiment.

As illustrated in FIG. 7, the information processing system 10 according to the third example embodiment includes a both-eye image acquisition unit 110, a both-eye feature extraction unit 130, a right-eye image acquisition unit 116, a right-eye feature extraction unit 136, a left-eye image acquisition unit 117, a left-eye feature extraction unit 137, a right-eye similarity map generation unit 141, a left-eye similarity map generation unit 142, a right-eye position detection unit 121, and a left-eye position detection unit 122, as components for realizing its functions. That is, the information processing system 10 according to the third example embodiment includes the components in the second example embodiment (see FIG. 5) separately for a right-eye and a left-eye.

The right-eye image acquisition unit 116 and the left-eye image acquisition unit 117 have the same functions as those of the one-eye image acquisition unit 115 in the second example embodiment. Specifically, the right-eye image acquisition unit 116 is configured to obtain a right-eye image containing a right eye as the reference one-eye image. The left-eye image acquisition unit 117 is configured to obtain a left-eye image containing a left eye as the reference one-eye image.

The right-eye feature extraction unit 136 and the left-eye feature extraction unit 137 have the same functions as those of the one-eye feature extraction unit 135 in the second example embodiment. Specifically, the right-eye feature extraction unit 136 is configured to extract a right-eye feature from the right-eye image obtained by the right-eye image acquisition unit 116. The left-eye feature extraction unit 137 is configured to extract a left-eye feature from the left-eye image obtained by the left-eye image acquisition unit 117.

The right-eye similarity map generation unit 141 and the left-eye similarity map generation unit 142 have the same functions as those of the similarity map generation unit 140 in the second example embodiment. Specifically, the right-eye similarity map generation unit 141 is configured to generate a right-eye similarity map on the basis of the right-eye feature extracted by the right-eye feature extraction unit 136 and the both-eye feature extracted by the both-eye feature extraction unit 130. The left-eye similarity map generation unit 142 is configured to generate a left-eye similarity map on the basis of the left-eye feature extracted by the left-eye feature extracting 137 and the both-eye feature extracted by the both-eye feature extraction unit 130.

The right-eye position detection unit 121 and the left-eye position detection unit 122 have the same functions as those of the eye position detection unit 120 in the second example embodiment. Specifically, the right-eye position detection unit 121 is configured to detect a right-eye position of the target in the both-eye image on the basis of the right-eye similarity map generated by the right-eye similarity map generation unit 141. The left-eye position detection unit 122 is configured to detect a left-eye position of the target in the both-eye image on the basis of the left-eye similarity map generated by the left-eye similarity map generation unit 142.
(Flow of Operation)

Next, with reference to FIG. 8, a flow of operation by the information processing system 10 according to the third example embodiment will be described. FIG. 8 is a flowchart illustrating the flow of operation by the information processing system according to the third example embodiment.

Figure 8:
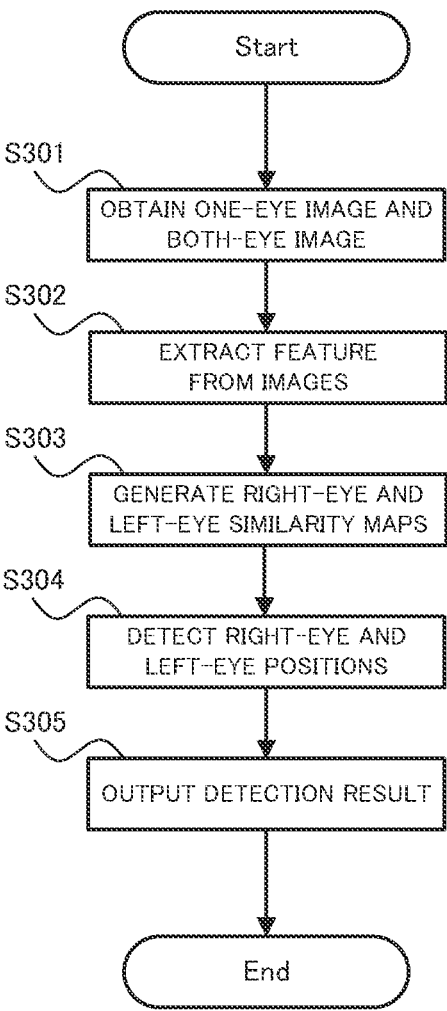
FIG. 8 is a flowchart illustrating a flow of operation by the information processing system according to the third example embodiment.

As illustrated in FIG. 8, in operation of the information processing system 10 according to the third example embodiment, firstly, the right-eye image acquisition unit 116 and the left-eye image acquisition unit 117 obtain the right-eye image and left-eye image, and the both-eye image acquisition unit 110 obtains the both-eye image (step S301). The right-eye image acquisition unit 116 and the left-eye image acquisition unit 117 may obtain images that are obtained by inverting the same image (one reference one-eye image), as the right-eye image and left-eye image, respectively.

Subsequently, the right-eye feature extraction unit 136 and the left-eye feature extraction unit 137 extract the right-eye feature and the left-eye feature from the right-eye image and the left-eye image, and the both-eye feature extraction unit 130 extracts the feature from the both-eye feature image (step S302). In this example, a process for the right-eye image, a process for the left-eye image, and a process for the both-eye image are performed in parallel; however, the process for the one-eye image and the process for the both-eye image may be performed, sequentially and separately.

Subsequently, the right-eye similarity map generation unit 141 generates the right-eye similarity map on the basis of the right-eye feature and the both-eye feature, and the left-eye similarity map generation unit 142 generates the left-eye similarity map on the basis of the left-eye feature and the both-eye feature (step S303). Then, the right-eye position detection unit 121 detects the right-eye position of the target on the basis of the right-eye similarity map, and the left-eye position detection unit 122 detects the left-eye position of the target on the basis of the left-eye similarity map (step S304). Then, the right-eye position detection unit 121 and the left-eye position detection unit 122 output a detection result (i.e., information about the detected right-eye position and information about the detected left-eye position) (step S305).

(Similarity Map)

Next, the similarity map generated by the information processing system 10 according to the third example embodiment will be specifically described with reference to FIG. 9. FIG. 9 is a plan view illustrating an example of the similarity map generated by the information processing system according to the third example embodiment.

Figure 9:
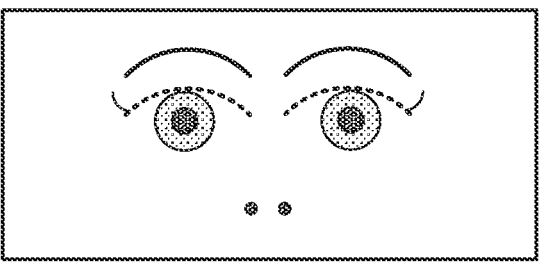
FIG. 9 is a plan view illustrating an example of a similarity map generated by the information processing system according to the third example embodiment.
Figure 9:
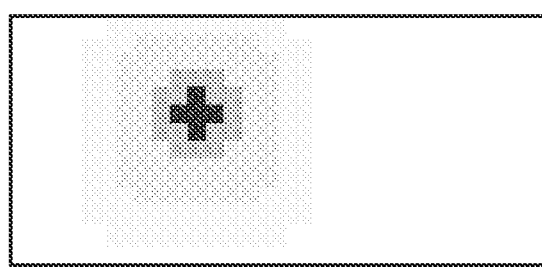
Figure 9:
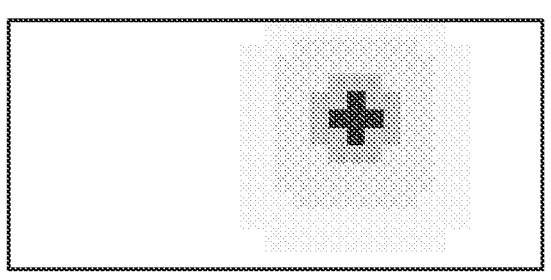

As illustrated in FIG. 9, the similarity map is generated to have a different display aspect in accordance with the extent/magnitude of the similarity. For example, the right-eye similarity map is displayed to be darker in a part with a higher similarity between the right-eye image and the both-eye image. The left-eye similarity map is displayed to be darker in a part with a higher similarity between the left-eye image and the both-eye image.

Technical Effect

Next, a technical effect obtained by the information processing system 10 according to the third example embodiment will be described.

As described in FIG. 7 to FIG. 9, in the information processing system 10 according to the third example embodiment, the position of the right eye is detected on the basis of the right eye similarity map generated by using the right-eye image, and the position of the left eye is detected on the basis of the left eye similarity map generated by using the left-eye image. In this way, it is possible to detect each of the position of the right eye and the position of the left eye with high accuracy.

Fourth Example Embodiment

The information processing system 10 according to a fourth example embodiment will be described with reference to FIG. 10. Incidentally, the fourth example embodiment differs from the second example embodiment described above only in the configuration and the operation, and may be the same as the first to third example embodiments described above in the other parts. Therefore, the parts that differ from the example embodiments described above will be described in detail below, and the other overlapping parts will not be described.

(Functional Configuration)

Firstly, with reference to FIG. 10, a functional configuration of the information processing system 10 according to the fourth example embodiment will be described. FIG. 10 is a block diagram illustrating the functional configuration of the information processing system according to the fourth example embodiment. Incidentally, in FIG. 10, the same components as those illustrated in FIG. 5 carry the same reference numerals.

Figure 10:
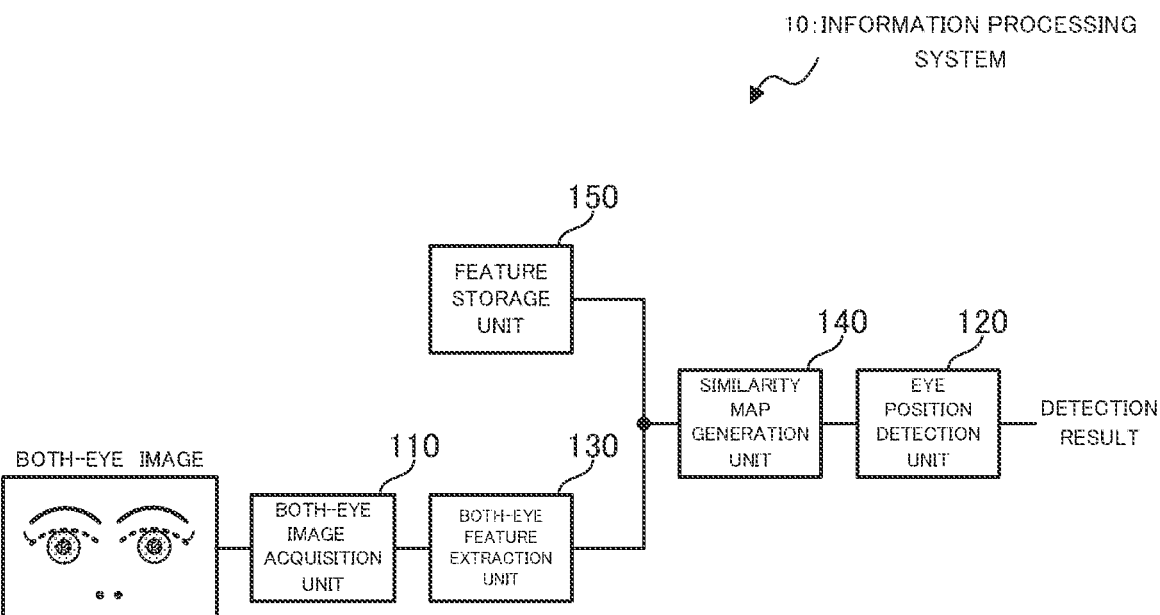
FIG. 10 is a block diagram illustrating a functional configuration of an information processing system according to a fourth example embodiment.

As illustrated in FIG. 10, the information processing system 10 according to the fourth example embodiment includes a both-eye image acquisition unit 110, an eye position detection unit 120, a feature extraction unit 130, a similarity map generation unit 140, and a feature storage unit 150, as components for realizing its functions. That is, the information processing system 10 according to the fourth example embodiment includes the feature storage unit 150, instead of the one-eye image acquisition unit 115 and the one-eye feature extraction unit 135 in the second example embodiment (see FIG. 5). The feature storage unit 150 may be implemented, for example, by the storage apparatus 14 described above.

The feature storage unit 150 is configured to store the one-eye feature extracted from the reference one-eye image. The one-eye feature stored in the feature storage unit 150 is configured to be read out such that the similarity map 140 generates the similarity map. That is, the one-eye feature stored in the feature storage unit 150 is used to calculate the similarity with the both-eye feature extracted by the both-eye feature extraction unit 130.

Technical Effect

Next, a technical effect obtained by the information processing system 10 according to the fourth example embodiment will be described.

As described in FIG. 10, in the information processing system 10 according to the fourth example embodiment, the one-eye feature corresponding to the reference one-eye image is stored in advance. In this way, the similarity map can be generated more efficiently because it eliminates a labor of obtaining the reference one-eye image and extracting the one-eye feature.

Fifth Example Embodiment

The information processing system 10 according to a fifth example embodiment will be described with reference to FIG. 11. Incidentally, the fifth example embodiment is intended to describe a condition relating to the size of an image, and may be the same as the first to fourth example embodiments described above in the configuration and the operation of the system. Therefore, the parts that differ from the example embodiments described above will be described in detail below, and the other overlapping parts will not be described.

(Image Size)

Firstly, with reference to FIG. 11, the size of an image handled by the information processing system 10 according to the fifth example embodiment will be described. FIG. 11 is a plan view illustrating an example of the one-eye image and the both-eye image handled by the information processing system according to the fifth example embodiment.

Figure 11:
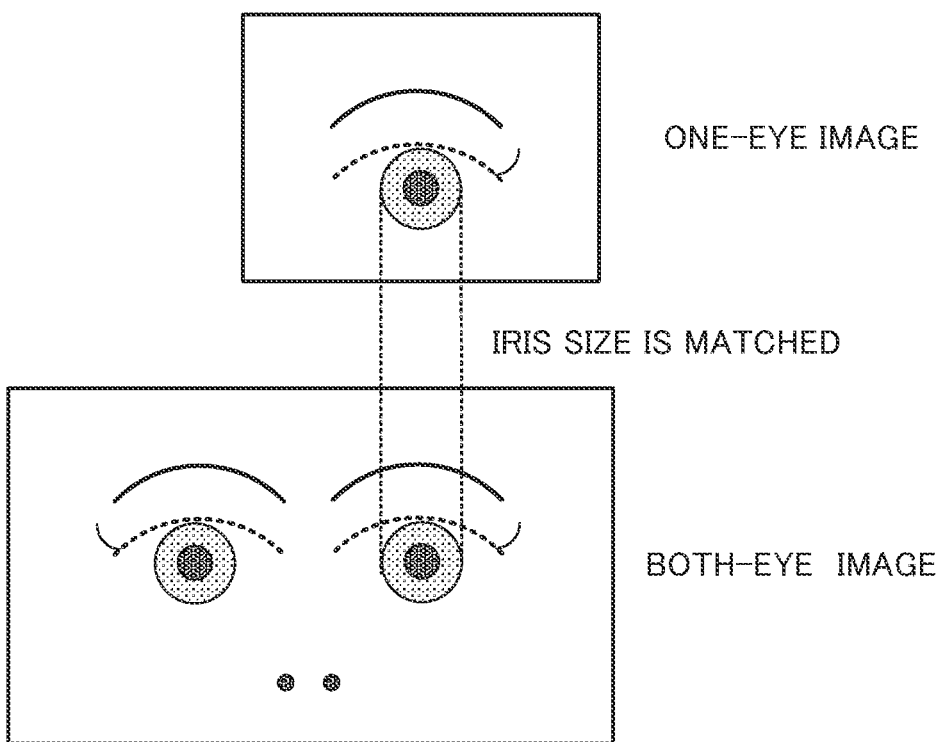
FIG. 11 is a plan view illustrating an example of a one-eye image and a both-eye image handled by an information processing system according to a fifth example embodiment.

As illustrated in FIG. 11, in the information processing system 10 according to the fifth example embodiment, the size of an eye in the reference one-eye image matches the size of an eye in the both-eye image. The size of an eye may be based, for example, on an iris diameter. For example, if an iris size of the reference one-eye image is about 10 pixels, then, the iris size of the both-eye image may be set to be about 10 pixels. The size of an eye may be set, for example, in accordance with the specifications of the camera 18 that captures the both-eye image. Specifically, the size of the reference one-eye image may be determined in accordance with the size of the both-eye image that is captured by the camera 18. Alternatively, the placement location or the like of the camera 18 that captures the both-eye image may be determined to match the size of the reference one-eye image with the size of the both-eye image. Alternatively, the both-eye image to input may be scaled (enlarged/reduced) in accordance with the iris size of the reference one-eye image.

Technical Effect

Next, a technical effect obtained by the information processing system 10 according to the fifth example embodiment will be described.

As described in FIG. 11, in the information processing system 10 according to the fifth example embodiment, the reference one-eye image and the both-eye image are set to have an eye of the same size. In this way, the similarity maps of the reference one-eye image and the second-eye image can be generated appropriately, as compared to those when the image sizes are not the same, so that the position of an eye of the target can be detected with higher accuracy.

Sixth Example Embodiment

The information processing system 10 according to a sixth example embodiment will be described with reference to FIG. 12. Incidentally, the sixth example embodiment illustrates a specific example of a method of generating the similarity map, and may be the same as the first to fifth example embodiments described above in the configuration and the operation of the system. Therefore, the parts that differ from the example embodiments described above will be described in detail below, and the other overlapping parts will not be described.

(Method of Generating Similarity Map)

Firstly, a method of generating the similarity map by the information processing system 10 according to the sixth example embodiment will be described with reference to FIG. 12. FIG. 12 is a conceptual diagram illustrating the method of generating the similarity map by the information processing system according to the sixth example embodiment.

Figure 12:
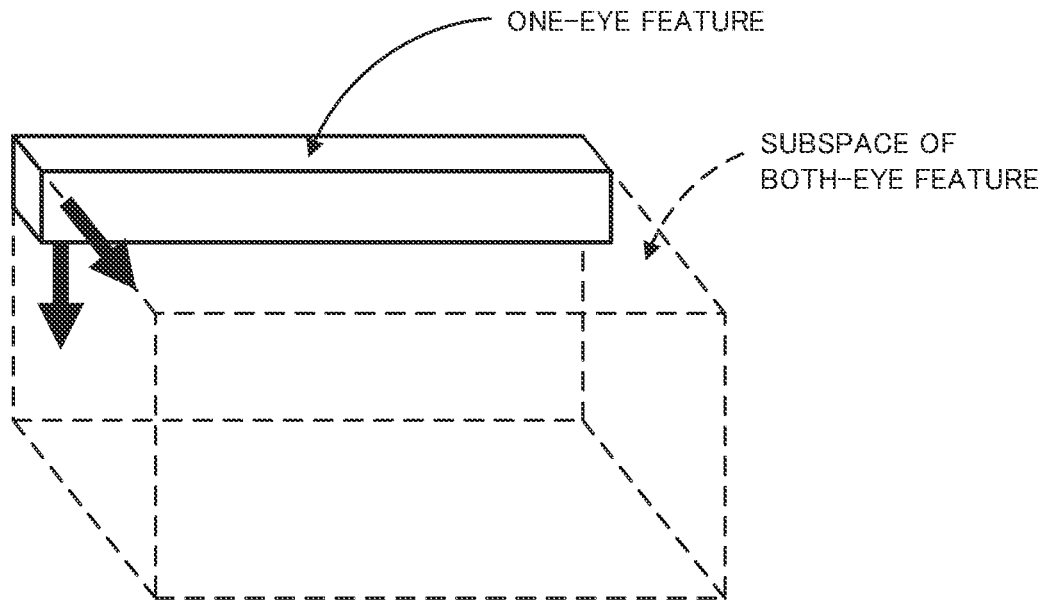
FIG. 12 is a conceptual diagram illustrating a method of generating the similarity map by an information processing system according to a sixth example embodiment.

As illustrated in FIG. 12, the information processing system 10 according to the sixth example embodiment generates the similarity map by calculating a similarity between the one-eye feature and a subspace of the both-eye feature. Here, it is assumed that each of a one-eye feature fref and a both-eye feature fsrch has a three-dimensional data size as illustrated in Equation (1) below. Note that a channel count C is the same for the one-eye feature fref and the both-eye feature fsrch.

[Equation 1]

$$f_{ref} \in R^{h \times w \times c}, f_{srch} \in R^{H \times W \times C} \tag{1}$$

The similarity between the one-eye feature fref and the both-eye feature fsrch may be calculated, for example, as a cosine similarity. Specifically, a similarity map Map[u](u is a spatial position of the map) may be calculated as illustrated in the following equation (2).

[Equation 2]

$$\mathrm{Map}[u] = \frac{f_{ref} \cdot f_{srch}[u]}{\|f_{ref}\| \|f_{srch}[u]\|} = \cos \theta_u \tag{2}$$

Technical Effect

Next, a technical effect obtained by the information processing system 10 according to the sixth example embodiment will be described.

As described in FIG. 12, in the information processing system 10 according to the sixth example embodiment, the similarity map indicating the similarity between the one-eye feature and the subspace of the both-eye feature is generated. This makes it possible to generate the similarity map more appropriately.

Seventh Example Embodiment

The information processing system 10 according to a seventh example embodiment will be described with reference to FIG. 13 and FIG. 14. Incidentally, the seventh example embodiment differs from the second example embodiment described above only in the configuration and the operation, and may be the same as the first to sixth example embodiments in the other parts. Therefore, the parts that differ from the example embodiments described above will be described in detail below, and the other overlapping parts will not be described.

(Functional Configuration)

Firstly, a functional configuration of the information processing system 10 according to the seventh example embodiment will be described with reference to FIG. 13. FIG. 13 is a block diagram illustrating the functional configuration of the information processing system according to the seventh example embodiment. Incidentally, in FIG. 13, the same components as those illustrated in FIG. 5 carry the same reference numerals.

Figure 13:
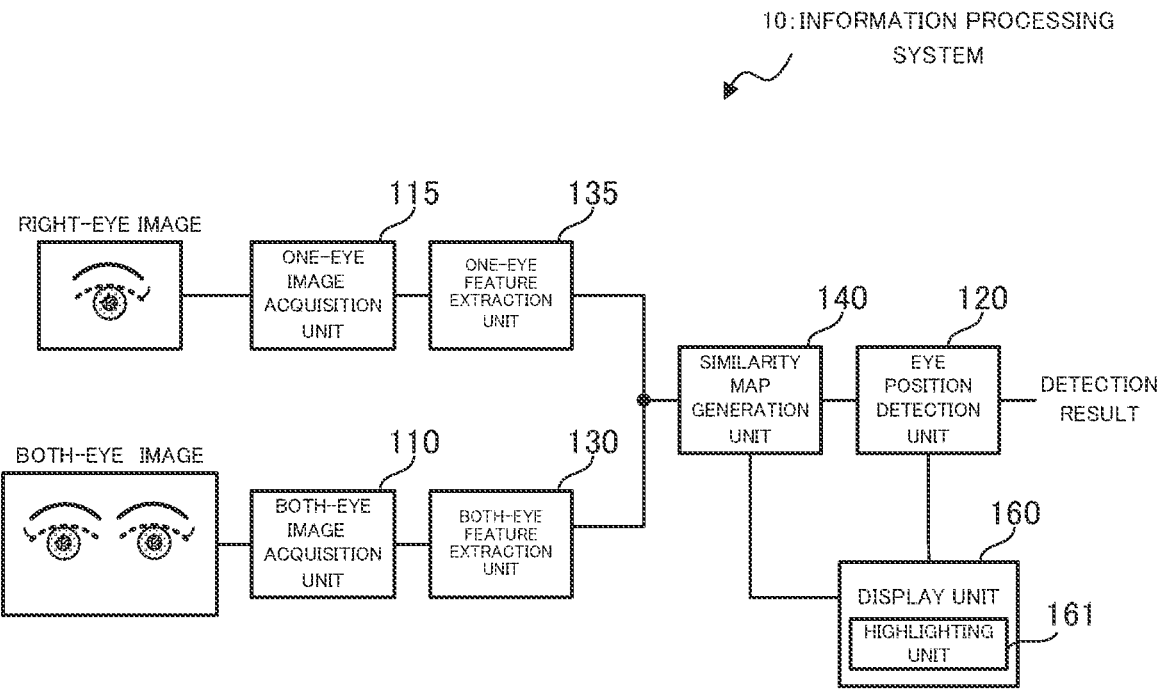
FIG. 13 is a block diagram illustrating a functional configuration of an information processing system according to a seventh example embodiment.

As illustrated in FIG. 13, the information processing system 10 according to the seventh example embodiment includes a both-eye image acquisition unit 110, a one-eye image acquisition unit 115, a both-eye feature extraction unit 130, a one-eye feature extraction unit 135, a similarity map generation unit 140, an eye position detection unit 120, and a display unit 160, as components for realizing its functions. That is, the information processing system according to the seventh example embodiment includes the display unit 160 in addition to the configuration of the second example embodiment (see FIG. 5). The display unit 160 may be implemented, for example, by the output apparatus 16 described above (see FIG. 1).

The display unit 160 includes a display that is capable of displaying an image, and is configured to display at least the similarity map generated by the similarity map generation unit 140. The display unit 160 according to the seventh example embodiment is particularly provided with a high-lighting unit 161. The highlighting unit 161 is configured to highlight the position of an eye detected by the eye position detection unit 130 on the similarity map displayed by the display unit 160.

(Highlighting)

Figure 14:
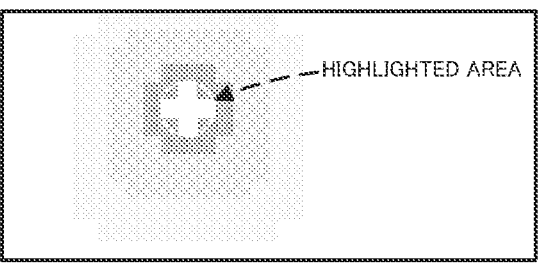
FIG. 14 is a plan view illustrating an example of highlighting the similarity map by the information processing system according to the seventh example embodiment.
Figure 14:
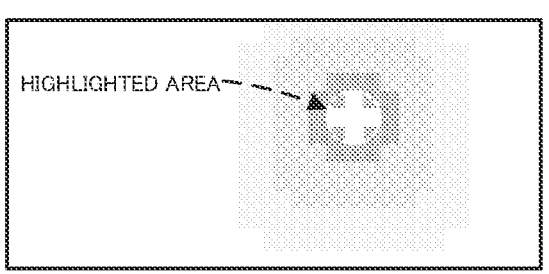

Next, with reference to FIG. 14, the highlighting of the similarity map by the information processing system 10 according to the seventh example embodiment will be specifically described. FIG. 14 is a plan view illustrating an example of highlighting the similarity map by the information processing system according to the seventh example embodiment.

As illustrated in FIG. 14, in the information processing system 10 according to the seventh example embodiment, a part that is detected as the position of an eye in the similarity map displayed by the display unit 160 is highlighted by the highlighting unit 161. An example aspect of the highlighting is not particularly limited, but, for example, the part corresponding to the position of an eye may be displayed in a conspicuous color (in the example in FIG. 14, the part corresponding to the position of an eye is displayed in white). Alternatively, the part corresponding to the eye position may blink on and off. Alternatively, a mark or a message may be displayed in the part corresponding to the eye position. Such highlighting may be performed, for example, in operation of the system, or may be performed in initial setting of the system. In this case, the highlighting may be displayed to a user such as a system administrator or a supervisor.

Technical Effect

Next, a technical effect obtained by the information processing system 10 according to the seventh example embodiment will be described.

As described in FIG. 13 and FIG. 14, in the information processing system 10 according to the seventh example embodiment, the detected eye position is highlighted on the similarity map. In this way, it is possible to clearly notify the user where the actually detected eye position is.

Eighth Example Embodiment

The information processing system 10 according to an eighth example embodiment will be described with reference to FIG. 15 to FIG. 17. Incidentally, the eighth example embodiment differs from the second example embodiment described above only in the configuration and the operation, and may be the same as the first to seventh example embodiments in the other parts. Therefore, the parts that differ from the example embodiments described above will be described in detail below, and the other overlapping parts will not be described.

(Functional Configuration)

Firstly, a functional configuration of the information processing system 10 according to the eighth example embodiment will be described with reference to FIG. 15. FIG. 15 is a block diagram illustrating the functional configuration of the information processing system according to the eighth example embodiment. Incidentally, in FIG. 15, the same components as those illustrated in FIGS. 5 and 13 carry the same reference numerals.

Figure 15:
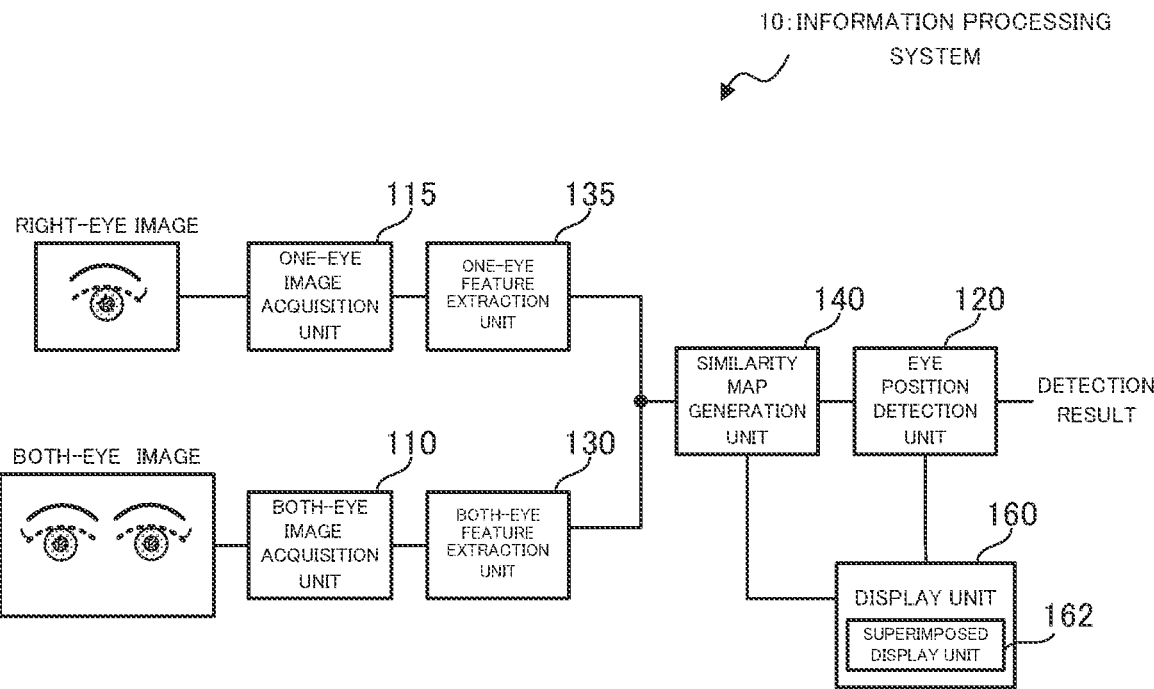
FIG. 15 is a block diagram illustrating a functional configuration of an information processing system according to an eighth example embodiment.

As illustrated in FIG. 15, the information processing system 10 according to the eighth example embodiment includes a both-eye image acquisition unit 110, a one-eye image acquisition unit 115, a both-eye feature extraction unit

130, a one-eye feature extraction unit 135, a similarity map generation unit 140, an eye position detection unit 120, and a display unit 160, as components for realizing its functions. That is, the information processing system according to the eighth example embodiment includes the display unit 160 in addition to the configuration of the second example embodiment (see FIG. 5). The display unit 160 may be implemented, for example, by the output apparatus 16 described above (see FIG. 1).

The display unit 160 includes a display that is capable of displaying an image, and is configured to display at least the both-eye image obtained by the both-eye image acquisition unit 110. Then, the display unit 160 according to the eighth example embodiment is particularly provided with a super-imposed display unit 162. The superimposed display unit 162 is configured to superimpose and display the position of an eye detected by the eye position detection unit 130 on the both-eye image displayed by the display unit 160.

(Superimposed Display)

Figure 16:
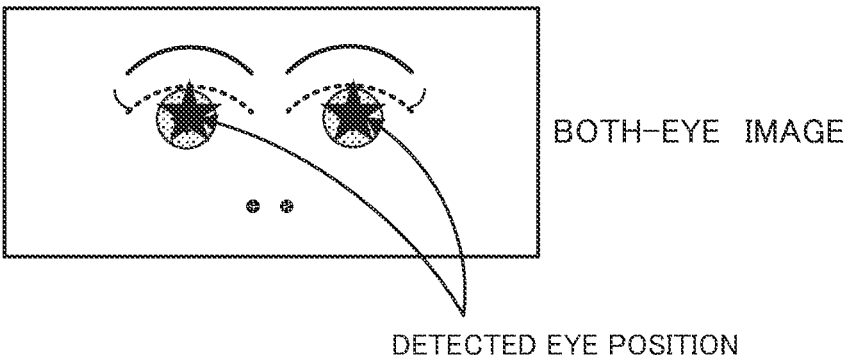
FIG. 16 is version 1 of a plan view illustrating an example of superimposed display on a both-eye image by the information processing system according to the eighth example embodiment.
Figure 17:
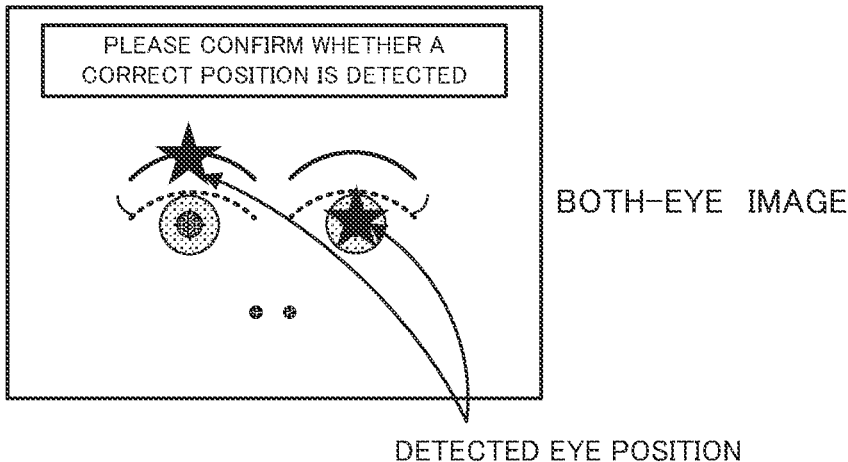
FIG. 17 is version 2 of a plan view illustrating an example of the superimposed display on the both-eye image by the information processing system according to the eighth example embodiment.

Next, with reference to FIG. 16 and FIG. 17, the super-imposed display on the both-eye display by the information processing system 10 according to the eighth example embodiment will be specifically described. FIG. 16 is version 1 of a plan view illustrating an example of the super-imposed display on the both-eye image by the information processing system according to the eighth example embodiment. FIG. 17 is version 2 of a plan view illustrating an example of the superimposed display on the both-eye image by the information processing system according to the eighth example embodiment.

As illustrated in FIG. 16, in the information processing system 10 according to the eighth example embodiment, a mark indicating that the detected position is superimposed and displayed on the position of an eye in the both-eye image displayed by the display unit 160 (in this case, a mark of a star is superimposed and displayed). Such highlighting (superimposed display?) may be performed, for example, in operation of the system, or may be performed in initial setting of the system.

As illustrated in FIG. 17, the superimposed display may be performed to allow a target user to determine whether or not the detected eye position is correct. For example, the superimposed display may be performed if the iris authen-tication using a result of the detection of the eye position fails. In this case, in addition to the superimposed display, a message such as "Please confirm whether a correct position is detected" as illustrated in FIG. 17 may be displayed. Incidentally, in the example illustrated in FIG. 17, a right eyebrow is detected as the right eye by mistake. In this situation, the user who sees the display can recognize that the eye position is not detected accurately.

Technical Effect

Next, a technical effect obtained by the information processing system 10 according to the eighth example embodiment will be described.

As described in FIG. 15 to FIG. 17, in the information processing system 10 according to the eighth example embodiment, the detected eye position is superimposed and displayed the on both-eye image. In this way, it is possible to clearly notify the user where the actually detected eye position is.

Incidentally, the highlighting described in the seventh example embodiment and the superimposed display described in the eighth example embodiment may be real-ized in combination. For example, the highlighted similarity map and the superimposed both-eye image may be displayed to be aligned on the same screen.

Ninth Example Embodiment

The information processing system 10 according to a ninth example embodiment will be described with reference to FIG. 18 and FIG. 19. Incidentally, the ninth example embodiment describes a learning operation using the one-eye image and the both-eye image, and may be the same as the first to eighth example embodiment in the configuration and the operation in operation of the system. Therefore, the parts that differ from the example embodiments described above will be described in detail below, and the other overlapping parts will not be described.
(Functional Configuration)

Firstly, a functional configuration of the information processing system 10 according to the ninth example embodiment will be described with reference to FIG. 18. FIG. 18 is a block diagram illustrating the functional configuration of an information processing system according to the ninth example embodiment. Incidentally, in FIG. 18, the same components as those illustrated in FIG. 5 carry the same reference numerals.

Figure 18:
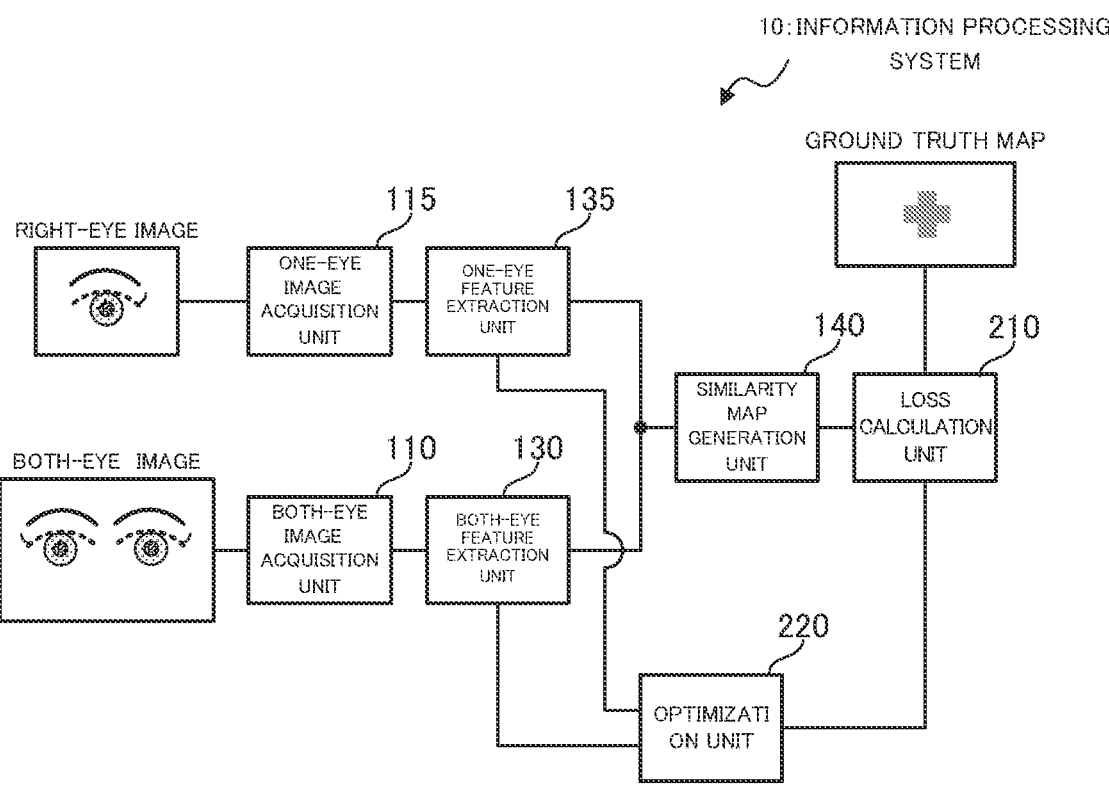
FIG. 18 is a block diagram illustrating a functional configuration of an information processing system according to a ninth example embodiment.

As illustrated in FIG. 18, the information processing system 10 according to the ninth example embodiment includes a both-eye image acquisition unit 110, a one-eye image acquisition unit 115, a both-eye feature extraction unit 130, a one-eye feature extraction unit 135, a similarity map generation unit 140, a loss calculation unit 210, and an optimization unit 220, as components for realizing its functions. That is, the information processing system according to the ninth example embodiment includes the loss calculation unit 210 and the optimization unit 220 in addition to the configuration of the second example embodiment (see FIG. 5). Each of the loss calculation unit 210 and the optimization unit 220 may be implemented, for example, by the processor 11 described above.

The loss calculation unit 210 is configured to generate a loss function based on the similarity map generated by the similarity map generation unit 140, and is configured to calculate a loss (error). The loss calculation unit 210 may use, for example, a difference between a ground truth map inputted as ground truth data and the similarity map generated by the similarity map generation unit 140, as the loss function. More specifically, for example, the similarity map may be normalized in a distribution of probability by a softmax function or the like, and a cross entropy with the ground truth map may be used as the loss function. The ground truth map may be, for example, a two-dimensional map in which a label "1" is given only for the position of an eye and a label "0" is given otherwise. Information about the loss calculated by the loss calculation unit 210 is configured to be outputted to the optimization unit 220.

The optimization unit 220 is configured to optimize parameters of the both-eye feature extraction unit 130 and the one-eye feature extraction unit 135 on the basis of the loss calculated by the loss calculation unit 210. Specifically, the optimization unit 220 optimizes the parameters by updating the parameters so as to reduce the loss calculated by the loss calculation unit 210. When the both-eye feature extraction unit 130 and the one-eye feature extraction unit 135 are configured as the same feature extraction unit, it is sufficient to optimize the parameters in one feature extraction unit.

(Learning Operation)

Next, a learning operation of the information processing system 10 according to the ninth example embodiment will be described with reference to FIG. 19. FIG. 19 is a flowchart illustrating a flow of the learning operation by the information processing system according to the ninth example embodiment.

Figure 19:
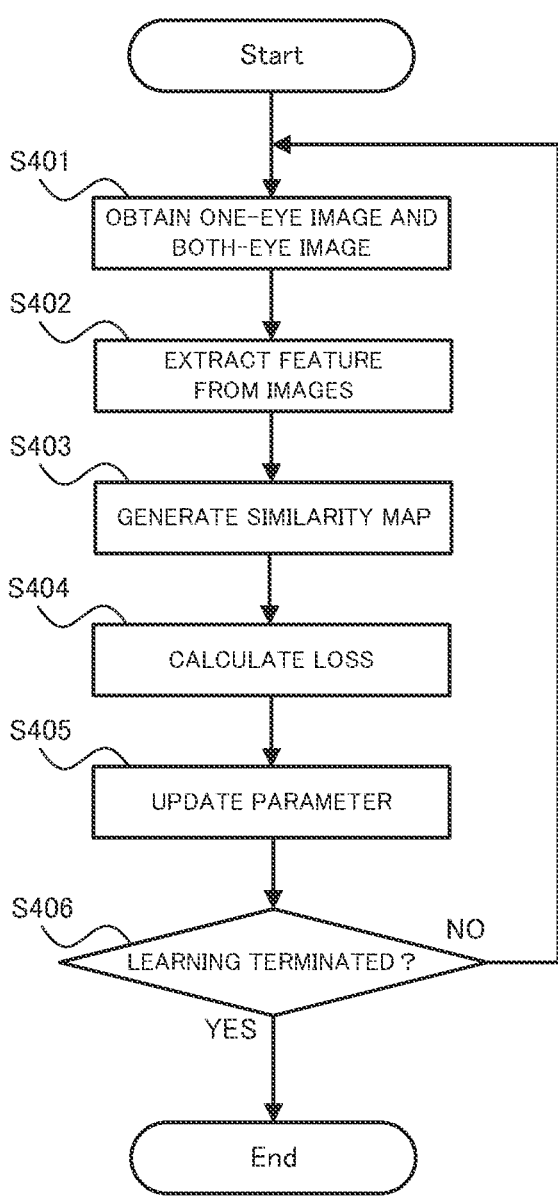
FIG. 19 is a flowchart illustrating a flow of a learning operation by the information processing system according to the ninth example embodiment.

As illustrated in FIG. 19, in the learning operation of the information processing system 10 according to the ninth example embodiment, firstly, the one-eye image acquisition unit 115 obtains the one-eye image, and the both-eye image acquisition unit 110 obtains the both-eye image (step S401). The one-eye image acquisition unit 115 obtains the right-eye image for learning about the right-eye and the left-eye image for learning about the left-eye. The one-eye image acquisition unit 115 may halve a ratio of the right-eye image and the left-eye image obtained so as to properly learn the right-eye and left-eye.

Then, the eye feature extraction unit 135 extracts the one-eye feature from the one-eye image, and the both-eye feature extraction unit 130 extracts the both-eye feature from the both-eye image (step S402). In this example, a process for the one-eye image and process of the both-eye image are performed in parallel; however, the process for the one-eye image and the process for the both-eye image may be performed sequentially and separately.

Subsequently, the similarity map generation unit 140 generates the similarity map on the basis of the one-eye feature extracted by the one-eye feature extraction unit 135 and the both-eye feature extracted by the both-eye feature extraction unit 130 (step S403).

Subsequently, the loss calculation unit 210 generates the loss function based on the similarity map generated by the similarity map generation unit 140 and calculates the loss (step S404). Then, the optimization unit 220 updates the parameters of the both-eye feature extraction unit 130 and the one-eye feature extraction unit 135 on the basis of the loss calculated by the loss calculation unit 210 (step S405).

Subsequently, the information processing system 10 according to the ninth example embodiment determines whether or not to end the learning (step S406). Whether or not to end the learning may be determined, for example, by whether or not to reach a preset iteration number. When it is determined that the learning is to be ended (the step S406: YES), a series of learning operation steps is ended. On the other hand, when it is determined that learning is not to be ended (the step S406: NO), the process from the step S401 is repeatedly performed.

Technical Effect

Next, a technical effect obtained by the information processing system 10 according to the ninth example embodiment will be described.

As described in FIG. 18 and FIG. 19, in the information processing system 10 according to the eighth example embodiment, the learning of the both-eye feature extraction unit 130 and the one-eye feature extraction unit 135 is performed by using the loss function based on the similarity map. In this way, it is possible to appropriately perform the learning that takes into account the similarity between the one-eye image and the both-eye image. Consequently, it is possible to detect the eye position of the target with high accuracy in operation of the system.

Tenth Example Embodiment

The information processing system 10 according to a tenth example embodiment will be described. Incidentally, the tenth example embodiment describes a specific example of the learning operation described in the ninth example embodiment, and may be the same as the ninth example embodiment in the configuration and the operation of the system. Therefore, the parts that differ from the example embodiments described above will be described in detail below, and the other overlapping parts will not be described.

(Learning on which Load is Applied)

Firstly, learning on which a load is applied by the information processing system 10 according to the tenth example embodiment will be described.

In the information processing system 10 according to the tenth example embodiment, learning is performed by emphasizing the similarity by applying a load to reduce the similarity of a part corresponding to a ground truth label in the similarity map. For example, CosFace can be used as a learning method in this case. More specifically, as in Equation (3) below, when calculating a BCE loss function with a ground truth map y, optimization time hyper parameters s and m may be applied.

[Equation 3]

$$L = -\frac{1}{|U|} \sum_{u \in U} \left\{ (1 - y[u]) \log \frac{e^{s \cos \theta_u}}{\sum_{t \in U, t \neq u} e^{s \cos \theta_t} + e^{s(\cos \theta_u - m)}} \right\} + \\ y[u] \log \frac{e^{s(\cos \theta_u - m)}}{\sum_{t \in U, t \neq u} e^{s \cos \theta_t} + e^{s(\cos \theta_u - m)}} \tag{3}$$

Technical Effect

Next, a technical effect obtained by the information processing system 10 according to the tenth example embodiment will be described.

As described above, in the information processing system 10 according to the tenth example embodiment, the learning is performed by applying a predetermined load to the loss function. In this way, the learning that emphasizes the similarity more can be performed as compared with the learning on which a load is not applied. This allows the detection of the eye position of the target with higher accuracy in operation of the system.

Eleventh Example Embodiment

The information processing system 10 according to an eleventh example embodiment will be described with reference to FIG. 20 and FIG. 21. Incidentally, the eleventh example embodiment differs from the first to tenth example embodiments described above only in the configuration and the operation, and may be the same as the first to tenth example embodiments described above in the other parts. Therefore, the parts that differ from the example embodiments described above will be described in detail below, and the other overlapping parts will not be described.

(Functional Configuration)

Firstly, a functional configuration of the information processing system 10 according to the eleventh example embodiment will be described with reference to FIG. 20. FIG. 20 is a block diagram illustrating the functional configuration of the information processing system according to the eleventh example embodiment. Incidentally, in FIG. 20, the same components as illustrated in FIG. 2 carry the same reference numerals.

Figure 20:
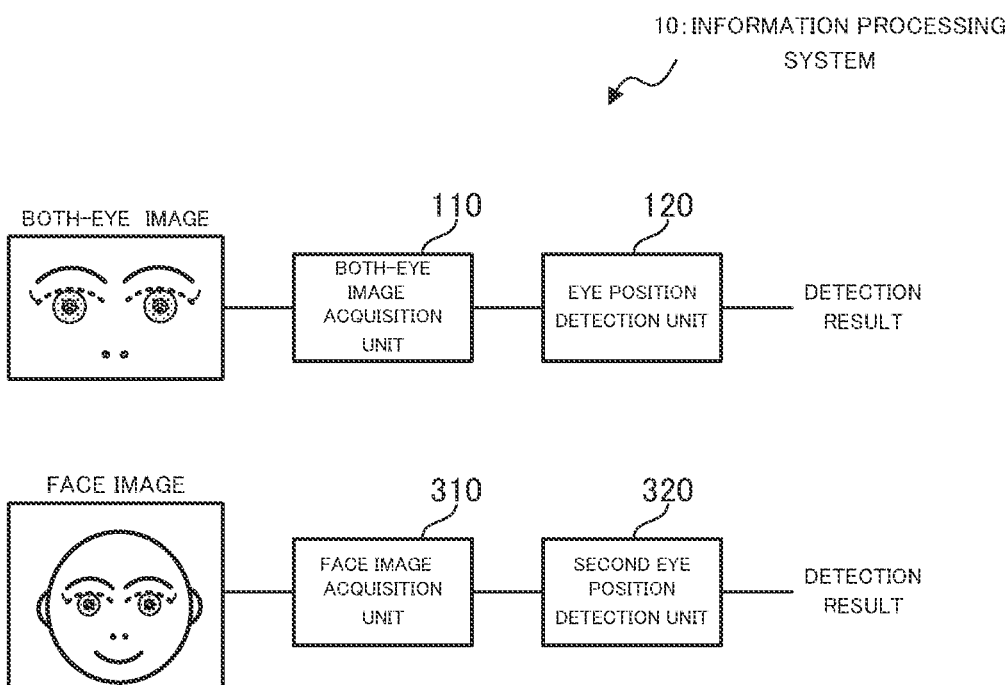
FIG. 20 is a block diagram illustrating a functional configuration of an information processing system according to an eleventh example embodiment.

As illustrated in FIG. 20, the information processing system 10 according to the eleventh example embodiment includes a both-eye image acquisition unit 110, an eye position detection unit 120, a face image acquisition unit 310, and a second eye position detection unit 320, as components for realizing its functions. That is, the information processing system 10 according to the eleventh example embodiment further includes the face image acquisition unit 310 and the second eye position detection unit 320 in addition to the configuration of the first example embodiment (see FIG. 2). Each of the face image acquisition unit 310 and the second eye position detection unit 320 may be a processing block implemented, for example, by the processor 11 described above (see FIG. 1). The face image acquisition unit 310 may also obtain an image by using the cameras 18 described above.

The face image acquisition unit 310 is configured to obtain a face image from the target. The face image is an image that contains a face of the target and that is captured by using visible light. The face image may contain a face range that is different from that of the both-eye image obtained by the both-eye image acquisition unit 110. For example, the face image may be an image containing an entire face of the target, while the both-eye image may be an image containing only the periphery of eyes of the target. The face image may be captured at the same timing as the both-eye image that is obtained by the both-eye image acquisition unit 110, or may be captured at a different timing. The face image obtained by the face image acquisition unit 310 is configured to be outputted to the second eye position detection unit 320. It is assumed that a visible light camera that obtains the face image and a camera that obtains the both-eye image (e.g., a near-infrared camera) are calibrated to find the correspondence of the imaging range.

The second eye position detection unit 320 is configured to detect the eye position of the target in the face image obtained by the face image acquisition unit 310. The second eye position detection unit 320 may detect, for example, the positions of both eyes (i.e., a right eye and a left eye), or may detect only the position of one of the eyes. The second eye position detection unit 320 may have a function of outputting information about the detected eye position. Incidentally, the second eye position detection unit 320 may be configured to detect the position of an eye of the target in a manner that is different from that of the eye position detection unit 120. That is, the second eye position detection unit 320 may detect the eye position of the target without using the result of the learning that uses the one-eye image and the both-eye image. For example, the second eye position detection unit 320 may detect parts other than the eyes contained in the face (e.g., a nose, an ear, a mouth, or the like) to detect the eye position from a positional relationship with each of the parts.

(Flow of Operation)

Next, with reference to FIG. 21, a flow of operation by the information processing system 10 according to the eleventh example embodiment will be described. FIG. 21 is a flowchart illustrating a flow of an eye position detecting operation using the face image in the information processing system according to the eleventh example embodiment. Since the operation of the both-eye image acquisition unit 110 and the eye position detection unit 120 may be the same as that in the first example embodiment, the operation related to the face image acquisition unit 310 and the second eye position detection unit 320 will be described below.

Figure 21:
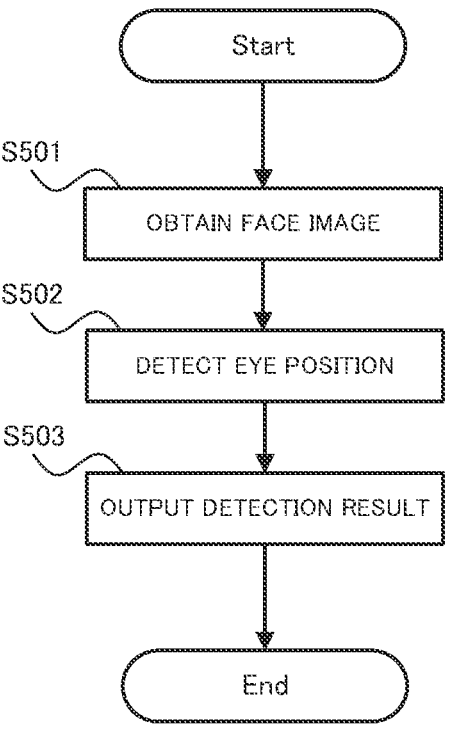
FIG. 21 is a flowchart illustrating a flow of an eye position detecting operation using a face image in the information processing system according to the 11th example embodiment.

As illustrated in FIG. 21, in operation of the information processing system 10 according to the eleventh example embodiment, firstly, the face image acquisition unit 310 obtains the face image from the target (step S501). The face image may be obtained, for example, with the target standing still in front of the camera 18, or may be obtained at a timing when the walking target arrives at a focal position of the camera 18. The face image acquisition unit 310 may obtain a plurality of face images from the same target.

Subsequently, the second eye position detection unit 320 detects the eye position of the target in the face image obtained by the face image acquisition unit 310 (step S502).

Then, the second eye position detection unit 320 outputs a detection result (i.e., information about the eye position detected from the face image) (step S503). The detection result of the second eye position detection unit 320 may be outputted separately from the detection result of the eye position detection unit 120, or may be outputted together with the detection result of the eye position detection unit 120. The use of the detection result of the second eye position detection unit 320 is not particularly limited. A specific example of the use of the detection result will be described in detail in another example embodiment described later.

Technical Effect

Next, a technical effect obtained by the information processing system 10 according to the eleventh example embodiment will be described.

As described in FIG. 20 and FIG. 21, in the information processing system 10 according to the eleventh example embodiment, the eye position of the target is also detected from the face image that is obtained separately from the both-eye image. In this way, the eye position of the target can be detected from both the both-eye image and the face image.

Twelfth Example Embodiment

The information processing system 10 according to a twelfth example embodiment will be described with reference to FIG. 22 and FIG. 23. Incidentally, the twelfth example embodiment differs from the eleventh example embodiment described above only in the configuration and the operation, and may be the same as the eleventh example embodiment described above in the other parts. Therefore, the parts that differ from the example embodiments described above will be described in detail below, and the other overlapping parts will not be described.
(Functional Configuration)

Firstly, a functional configuration of the information processing system 10 according to the twelfth example embodiment will be described with reference to FIG. 22. FIG. 22 is a block diagram illustrating the functional configuration of the information processing system according to the twelfth example embodiment. Incidentally, in FIG. 22, the same components as those illustrated in FIG. 20 carry the same reference numerals.

Figure 22:
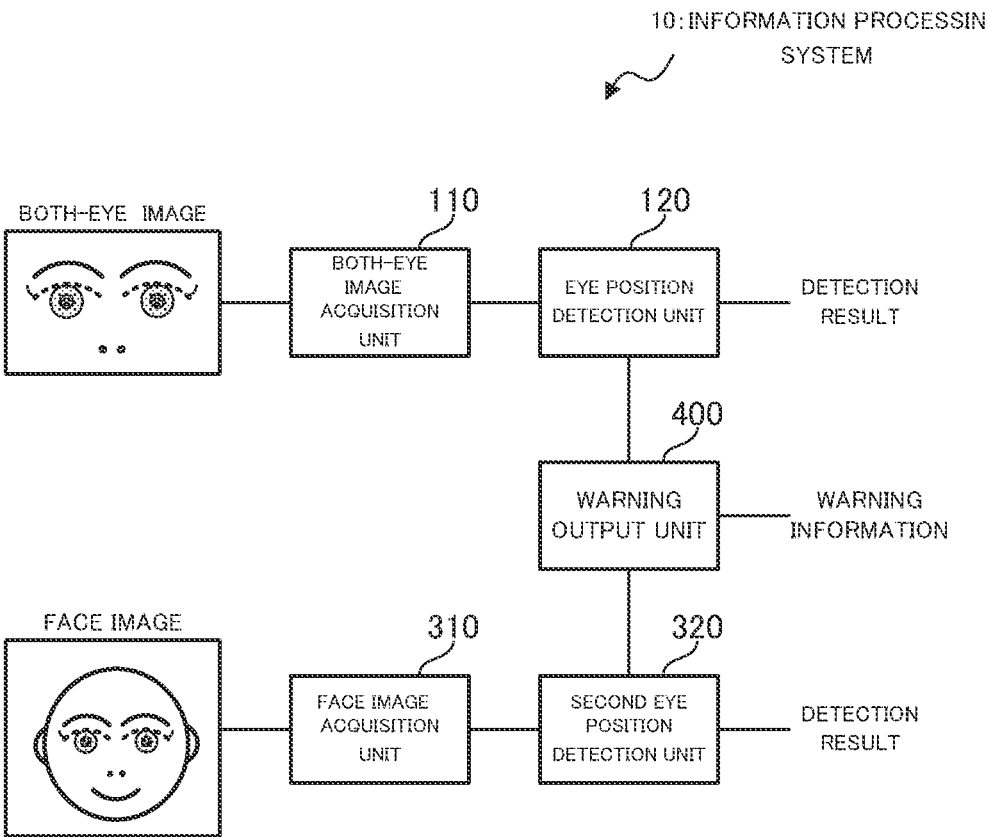
FIG. 22 is a block diagram illustrating a functional configuration of an information processing system according to a twelfth example embodiment.

As illustrated in FIG. 22, the information processing system 10 according to the twelfth example embodiment includes a both-eye image acquisition unit 110, an eye position detection unit 120, a face image acquisition unit 310, a second eye position detection unit 320, and a warning output unit 400, as components for realizing its functions. That is, the information processing system 10 according to the twelfth example embodiment further includes a warning output unit 400 in addition to the configuration of the eleventh example embodiment (see FIG. 20). The warning output unit 400 may be a processing block implemented, for example, by the processor 11 described above (see FIG. 1). Furthermore, the warning output unit 400 may be one that outputs a warning by using the output apparatus 16 described above.

The warning output unit 400 is configured to output a warning information when the eye position of the target detected by the eye position detection unit 120 (i.e., the eye position detected from the both-eye image) is different from the eye position of the target detected by the second eye position detection unit 320 (i.e., the eye position detected from the face image). Therefore, the warning output unit 400 has a function of comparing the eye position detected from the both-eye image with the eye position detected from the face image. Furthermore, the warning output unit 400 has a function of outputting the warning information in response to a comparison result. An aspect of outputting the warning information is not particularly limited. The warning information may be displayed as an image, for example, by using a display. Alternatively, the warning information may be outputted as audio, for example, by using a speaker.
(Flow of Operation)

Next, with reference to FIG. 23, a flow of operation by the information processing system 10 according to the twelfth example embodiment will be described. FIG. 23 is a flowchart illustrating a flow of operation by the information processing system according to the twelfth example embodiment. Incidentally, in FIG. 23, the same steps as those illustrated in FIG. 3 and FIG. 21 carry the same reference numerals.

Figure 23:
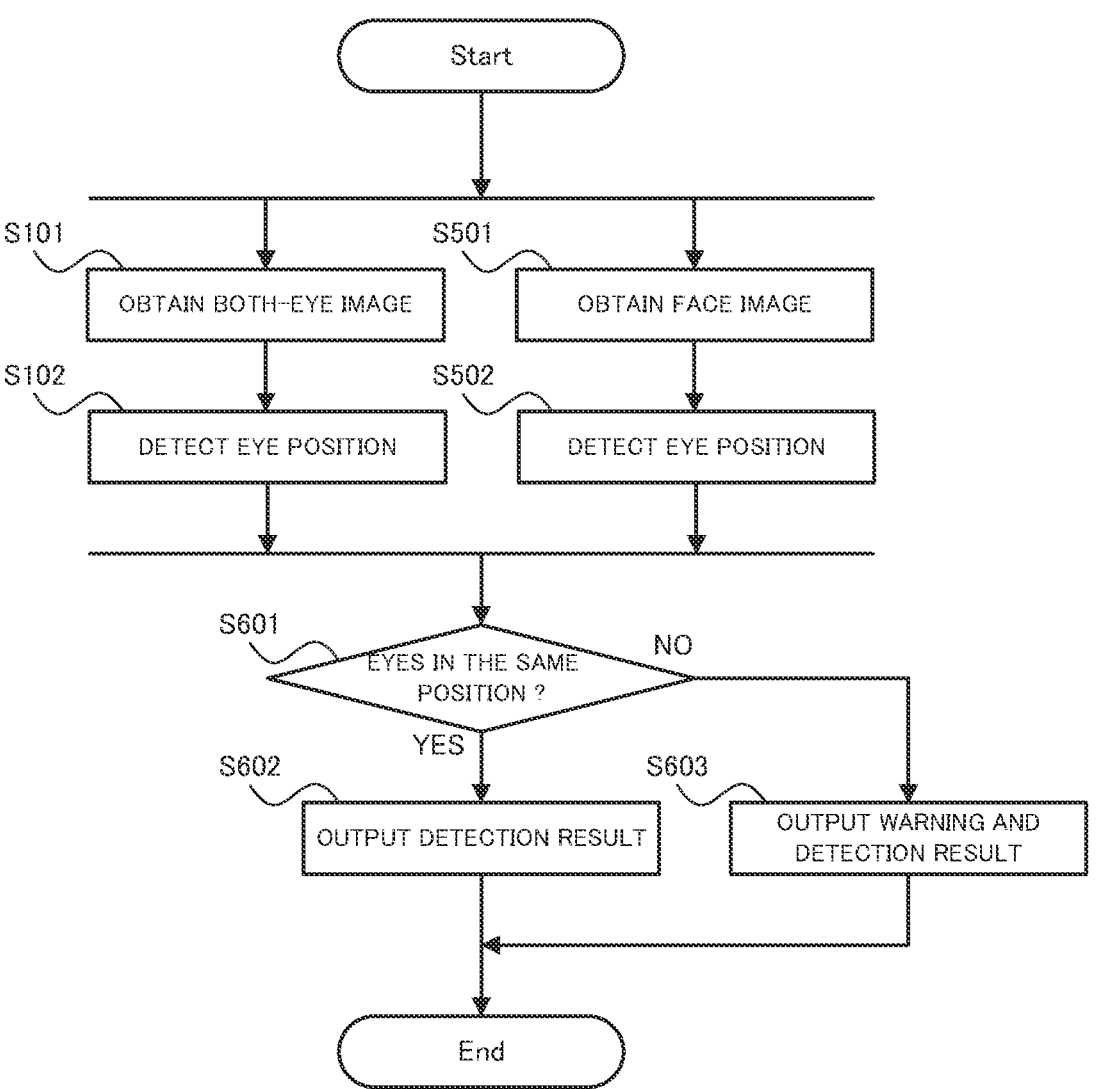
FIG. 23 is a flowchart illustrating a flow of operation by the information processing system according to the twelfth example embodiment.

As illustrated in FIG. 23, in operation of the information processing system 10 according to the eleventh example embodiment, firstly, the both-eye image acquisition unit 110 obtains the both-eye image from the target (step S101). Then, the eye position detection unit 120 detects the eye position of the target in the both-eye image obtained by the both-eye image acquisition unit 110 (step S102).

On the other hand, the face image acquisition unit 310 obtains the face image from the target (step S501). Then, the second eye position detection unit 320 detects the eye position of the target in the face image obtained by the face image acquisition unit 310 (step S502).

Incidentally, a process of detecting the eye position from the both-eye image (i.e., the steps S101 and S102) and a process of detecting the eye position from the face image (i.e., the step S501 and S102) may be performed in parallel at the same time, or may be performed sequentially and separately. For example, firstly, the eye position of the target may be determined on the basis of the face image, and an imaging position of the both-eye image may be determined on the basis of the detected eye position.

Subsequently, the warning output unit 400 determines whether or not the eye position detected from the both-eye image is the same as the eye position detected from the face image (step S601). Whether or not the detected eye positions are the same may be determined, for example, by whether or not a difference between the respective eye positions is within a predetermined range.

When the eye position detected from the both-eye image is the same as the eye position detected from the face image (the step S601: YES), the eye position detection unit 110 and the second eye position detection unit 310 output respective detection results (step S602). On the other hand, when the eye position detected from the both-eye image is not the same as the position detected from the face image (the step S601: NO), the eye position detection unit 110 and the second eye position detection unit 310 output the respective detection results, and the warning output unit 400 outputs the warning information (step S603).

The warning information may be outputted together with the detection results of the eye position by the eye position detection unit 110 and the second eye position detection unit 310. For example, as described in FIG. 16 and FIG. 17, the image and the eye positions of the target may be displayed on the display, and a warning message such as "the detected eye positions are different" may be displayed.

Technical Effect

Next, a technical effect obtained by the information processing system 10 according to the twelfth example embodiment will be described.

As described in FIG. 22 and FIG. 23, in the information processing system 10 according to the twelfth example embodiment, when the eye position detected from the both-eye image is different from the eye position detected from the face image, the warning information is outputted. In this way, when at least one of the detection based on the both-eye image and the detection based on the face image is possibly a false detection, it is possible to notify the user (e.g., target, system manager, supervisor, etc.) of that.

A processing method of recording a program for operating the configuration of each of the example embodiments to realize the functions of each of the example embodiments described above on a recording medium, of reading the program recorded on the recording medium as a code, and of executing it in the computer is also included in the scope of each of the example embodiments. That is, a computer readable recording medium is also included in the scope of each of the example embodiments. In addition to the above-described recording medium on which the program is recorded, the program itself is also included in each of the example embodiments.

For example, a floppy (registered trademark) disk, a hard disk, an optical disk, a magnetic-optical disk, a CD-ROM, a magnetic tape, a non-volatile memory card, or a ROM can be used as the recording medium. In addition, not only the program itself that is recorded on the recording medium and that executes processing, but also the program that operates on an operating system and executes processing in collaboration with other software and expansion-board functions is included in the scope of each of the example embodiments.

Supplementary Notes

With respect to the example embodiments described above, it may be further described as Supplementary Note below, but is not limited to the following.

Supplementary Note 1

An information processing system described in Supplementary Note 1 is an information processing system including: an acquisition unit that obtains a both-eye image, which is an image of a face containing both eyes, from a target; and a detection unit that detects an eye position of the target in the both-eye image on the basis of a result of learning that uses a one-eye image containing only one of the eyes and the both-eyes image.

Supplementary Note 2

An information processing system described in Supplementary Note 2 is the information processing system described in Supplementary Note 1, further comprising a generation unit that generates a similarity map by using a feature of the one-eye image and a feature the both-eye image of the target, wherein the detection unit detects the eye position of the target on the basis of the similarity map.

Supplementary Note 3

An information processing system described in Supplementary Note 3 is the information processing system described in Supplementary Note 2, wherein the generation unit generates the similarity map for a right eye by using a feature of a right-eye image containing the right eye and the feature of the both-eye image of the target, and generates the similarity map for a left eye by using a feature of a left-eye image containing the left eye and the feature of the both-eye image of the target, and the detection unit detects a position of the right eye of the target on the basis of the similarity map for the right eye, and detects a position of the left eye of the target on the basis of the similarity map for the left eye.

Supplementary Note 4

An information processing system described in Supplementary Note 4 is the information processing system described in Supplementary Note 2 or 3, wherein the generation unit stores the feature extracted from the one-eye image in advance and generates the similarity map by using the stored feature.

Supplementary Note 5

An information processing system described in Supplementary Note 5 is the information processing system described in any one of Supplementary Notes 2 to 4, wherein the generation unit generates the similarity map by using the one-eye image and the both-eye image having the same eye size.

Supplementary Note 6

An information processing system described in Supplementary Note 6 is the information processing system described in any one of Supplementary Notes 2 to 5, wherein the generation unit generates the similarity map that indicates a similarity between the feature of the one-eye image and a subspace of the feature of the both-eye image.

Supplementary Note 7

An information processing system described in Supplementary Note 7 is the information processing system described in any one of Supplementary Notes 2 to 6, further including a highlighting unit that highlights the eye position detected by the detection unit on the similarity map.

Supplementary Note 8

An information processing system described in Supplementary Note 8 is the information processing system described in any one of Supplementary Notes 1 to 7, further including a superimposed display unit that superimposes and displays the eye position detected by the detection unit on the both-eye image of the target.

Supplementary Note 9

An information processing system described in Supplementary Note 9 is the information processing system described in any one of Supplementary Notes 1 to 8, further including a learning unit that allows the detection unit to learn by generating a loss function based on the similarity map and minimizing the loss function.

Supplementary Note 10

An information processing system described in Supplementary Note 10 is the information processing system described in Supplementary Note 9, wherein the learning unit performs learning on which a load is applied to reduce the similarity of a part corresponding to the eye position in the similarity map.

Supplementary Note 11

An information processing system described in Supplementary Note 11 is the information processing system described in any one of Supplementary Notes 1 to 10, further including: a face image acquisition unit that obtains a visible-light face image by imaging the face of the target with a visible-light camera; and a second detection unit that detects the eye position of the target in the visible-light face image on the basis of the visible-light face image.

Supplementary Note 12

An information processing system described in Supplementary Note 12 is the information processing system described in Supplementary Note 11, further including a warning unit that outputs a warning information when the eye position of the target detected by the detection unit is different from the eye position of the target detected by the second detection unit.

Supplementary Note 13

An information processing apparatus described in Supplementary Note 13 is an information processing apparatus including: an acquisition unit that obtains a both-eye image, which is an image of a face containing both eyes, from a target; and a detection unit that detects an eye position of the target in the both-eye image on the basis of a result of learning that uses a one-eye image containing only one of the eyes and the both-eyes image.

Supplementary Note 14

An information processing method described in Supplementary Note 14 is an information processing method executed by at least one computer, including: obtaining a both-eye image, which is an image of a face containing both eyes, from a target; and detecting an eye position of the target in the both-eye image on the basis of a result of learning that uses a one-eye image containing only one of the eyes and the both-eyes image.

Supplementary Note 15

A recording medium described in Supplementary Note 15 is a recording medium on which a computer program that allows at least one computer to execute an information processing method is recorded, the information processing method including: obtaining a both-eye image, which is an image of a face containing both eyes, from a target; and detecting an eye position of the target in the both-eye image on the basis of a result of learning that uses a one-eye image containing only one of the eyes and the both-eyes image.

Supplementary Note 16

A computer program described in Supplementary Note 16 is a computer program that allows at least one computer to execute an information processing method, the information processing method including: obtaining a both-eye image, which is an image of a face containing both eyes, from a target; and detecting an eye position of the target in the both-eye image on the basis of a result of learning that uses a one-eye image containing only one of the eyes and the both-eyes image.

This disclosure is not limited to the examples described above and is allowed to be changed, if desired, without departing from the essence or spirit of the invention which can be read from the claims and the entire specification. An information processing system, an information processing apparatus, an information processing method, and a recording medium with such changes also intended to be within the technical scope of this disclosure.

DESCRIPTION OF REFERENCE CODES

10 Information processing system
11 Processor
18 Camera
110 Both-eye image acquisition unit
115 One-eye image acquisition unit
116 Right-eye image acquisition unit
117 Left-eye image acquisition unit
120 Eye position detection unit
121 Right-eye position detection unit
122 Left-eye position detection unit
130 Both-eye feature extraction unit
135 One-eye feature extraction unit
136 Right-eye feature extraction unit t
137 Left-eye feature extraction unit
140 Similarity map generation unit
141 Right-eye similarity map generation unit
142 Left-eye similarity map generation unit
150 Feature storage unit
160 Display unit
161 Highlighting unit
162 Superimposed display unit
210 Loss calculation unit
220 Optimization unit
310 Face image acquisition unit
320 Second eye position detection unit
400 Warning output unit

What is claimed is:
1. An information processing system comprising:
at least one memory that is configured to store information; and
at least one processor configured to execute instructions to:
obtain a both-eye image, which is an image of a face containing both eyes, from a target, and
detect an eye position of the target in the both-eye image based on a result of learning that uses a one-eye image containing only one eye of the target and the both-eye image, wherein the at least one processor is further configured to execute the instructions to:

generate a similarity map by using a feature of the one-eye image and a feature of the both-eye image of the target, and detect the eye position of the target based on the similarity map.

2. The information processing system according to claim 1, wherein the at least one processor is further configured to execute the instructions to:

in a case in which the one-eye image is a right-eye image, generate a similarity map for a right eye by using a feature of the right-eye image containing the right eye and the feature of the both-eye image of the target, and in a case in which the one-eye image is the left-eye image, generate a similarity map for a left eye by using a feature of the left-eye image containing the left eye and the feature of the both-eye image of the target, and detect a position of the right eye of the target based on the similarity map for the right eye, and detect a position of the left eye of the target based on the similarity map for the left eye.

3. The information processing system according to claim 1, wherein the at least one processor is further configured to execute the instructions to store the feature extracted from the one-eye image in advance and generate the similarity map by using the stored feature.

4. The information processing system according to claim 1, wherein the at least one processor is further configured to execute the instructions to generate the similarity map by using the one-eye image and the both-eye image having a same eye size.

5. The information processing system according to claim 1, wherein the at least one processor is further configured to execute the instructions to generate the similarity map that indicates a similarity between the feature of the one-eye image and a subspace of the feature of the both-eye image.

6. The information processing system according to claim 1, wherein the at least one processor is further configured to execute the instructions to highlight the eye position detected, on the similarity map.

7. The information processing system according to claim 1, wherein the at least one processor is further configured to execute the instructions to superimpose and display the eye position detected, on the both-eye image of the target.

8. The information processing system according to claim 1, wherein the at least one processor is further configured to execute the instructions to allow learning by generating a loss function based on the similarity map and minimizing the loss function.

9. The information processing system according to claim 8, wherein the at least one processor is further configured to execute the instructions to perform learning on which a load is applied to reduce a similarity of a part corresponding to the eye position in the similarity map.

10. The information processing system according to claim 1, wherein the at least one processor is further configured to execute the instructions to:

obtain a visible-light face image by imaging the face of the target with a visible-light camera; and detect the eye position of the target in the visible-light face image based on the visible-light face image.

11. The information processing system according to claim 10, wherein the at least one processor is further configured to execute the instructions to output a warning information when the eye position of the target detected in the both-eye image is different from the eye position of the target detected in the visible-light face image.

12. An information processing method executed by at least one computer, comprising:

obtaining a both-eye image, which is an image of a face containing both eyes, from a target; and detecting an eye position of the target in the both-eye image based on a result of learning that uses a one-eye image containing only one eye of the target and the both-image, wherein the information processing method further comprises:

generating a similarity map by using a feature of the one-eye image and a feature of the both-eye image of the target, and detecting the eye position of the target based on the similarity map.

13. A non-transitory recording medium on which a computer program that allows at least one computer to execute an information processing method is recorded, the information processing method including:

obtaining a both-eye image, which is an image of a face containing both eyes, from a target; and detecting an eye position of the target in the both-eye image based on a result of learning that uses a one-eye image containing only one eye of the target and the both-eye image, wherein the information processing method further comprises:

generating a similarity map by using a feature of the one-eye image and a feature of the both-eye image of the target, and detecting the eye position of the target based on the similarity map.

* * * * *